(12) United States Patent
Penick et al.

(10) Patent No.: US 7,185,412 B2
(45) Date of Patent: Mar. 6, 2007

(54) MULTI-AXIS, PROCESSOR-CONTROLLED, TOOLHEAD POSITIONER

(75) Inventors: William Arthur Penick, Spring, TX (US); Robert Allen Fomey, Clarksville, TN (US)

(73) Assignee: Precision Spherical Corp., Reno, NV (US)

( * ) Notice: Subject to any disclaimer, the term of this patent is extended or adjusted under 35 U.S.C. 154(b) by 165 days.

(21) Appl. No.: 11/120,269

(22) Filed: May 2, 2005

(65) Prior Publication Data

US 2006/0242818 A1     Nov. 2, 2006

(51) Int. Cl.
  B23P 23/00   (2006.01)
  B23C 1/12    (2006.01)
  B23D 1/14    (2006.01)

(52) U.S. Cl. .................. 29/560; 29/26 A; 29/33 R; 409/201; 409/202; 409/212; 409/162; 408/236

(58) Field of Classification Search ............... 29/560, 29/26 A, 26 R; 409/165, 167, 163, 164, 409/201, 202, 235, 212; 408/236, 237, 234, 408/235, 129; 83/939, 970, 941
See application file for complete search history.

(56) References Cited

U.S. PATENT DOCUMENTS

| | | | | |
|---|---|---|---|---|
| 3,460,435 | A * | 8/1969 | Dahl et al. ................. 409/235 |
| 3,998,127 | A * | 12/1976 | Romeu ....................... 408/234 |
| 4,146,966 | A | 4/1979 | Levine |
| 4,149,708 | A * | 4/1979 | Fink et al. ................... 269/69 |
| 4,589,174 | A * | 5/1986 | Allen ......................... 29/33 R |
| 4,658,485 | A * | 4/1987 | Yang .......................... 29/26 A |
| 4,848,942 | A | 7/1989 | Speicher |
| 4,858,301 | A * | 8/1989 | Galarowic ................... 29/564 |
| 5,051,054 | A * | 9/1991 | Wagner et al. .............. 414/618 |
| 5,190,384 | A | 3/1993 | Speicher |
| 5,203,088 | A | 4/1993 | Morgan |
| 5,405,222 | A * | 4/1995 | Ward ......................... 409/201 |
| 5,699,599 | A * | 12/1997 | Zieve ......................... 29/26 A |
| 5,839,323 | A * | 11/1998 | Line .......................... 409/212 |
| 5,943,750 | A * | 8/1999 | Koren et al. ................ 29/26 A |
| 6,068,431 | A * | 5/2000 | Line .......................... 409/202 |
| 6,070,312 | A * | 6/2000 | Mantovani .................. 29/26 A |
| 6,145,178 | A | 11/2000 | Green |
| 6,223,413 | B1 * | 5/2001 | Crocker et al. ............ 29/524.1 |
| 6,502,002 | B2 | 12/2002 | Susnjara |
| 6,682,276 | B2 * | 1/2004 | Harami et al. .............. 409/134 |
| 6,839,954 | B2 * | 1/2005 | Gunstone ..................... 29/563 |
| 2002/0085893 | A1 * | 7/2002 | Geiger et al. ............... 409/201 |
| 2003/0049087 | A1 * | 3/2003 | Gronbach et al. .......... 409/235 |
| 2004/0037663 | A1 * | 2/2004 | Zarske ........................ 409/201 |
| 2004/0151556 | A1 * | 8/2004 | Ferrari et al. ............... 409/201 |

* cited by examiner

*Primary Examiner*—Dana Ross
(74) *Attorney, Agent, or Firm*—Charles Allen IV

(57) ABSTRACT

A multi-axis, computerized numerically-controlled (CNC) toolhead positioning device with six degrees of freedom of movement while utilizing only five axes of movement, comprising a rotating workpiece mount assembly (28) and a rotating gantry (64) with a mounted toolhead assembly base (80). Perpendicular rotational axes about a mounted workpiece (26) provide the capability to perform specific toolhead operations on the arcuate surface of the workpiece (26), subject to the type of mounted toolhead assembly. The computer (120) uses CNC software to integrate operator instructions, machining operations, and the sequence of operations into an automatic and coherent machining package.

22 Claims, 17 Drawing Sheets

Figure 1:
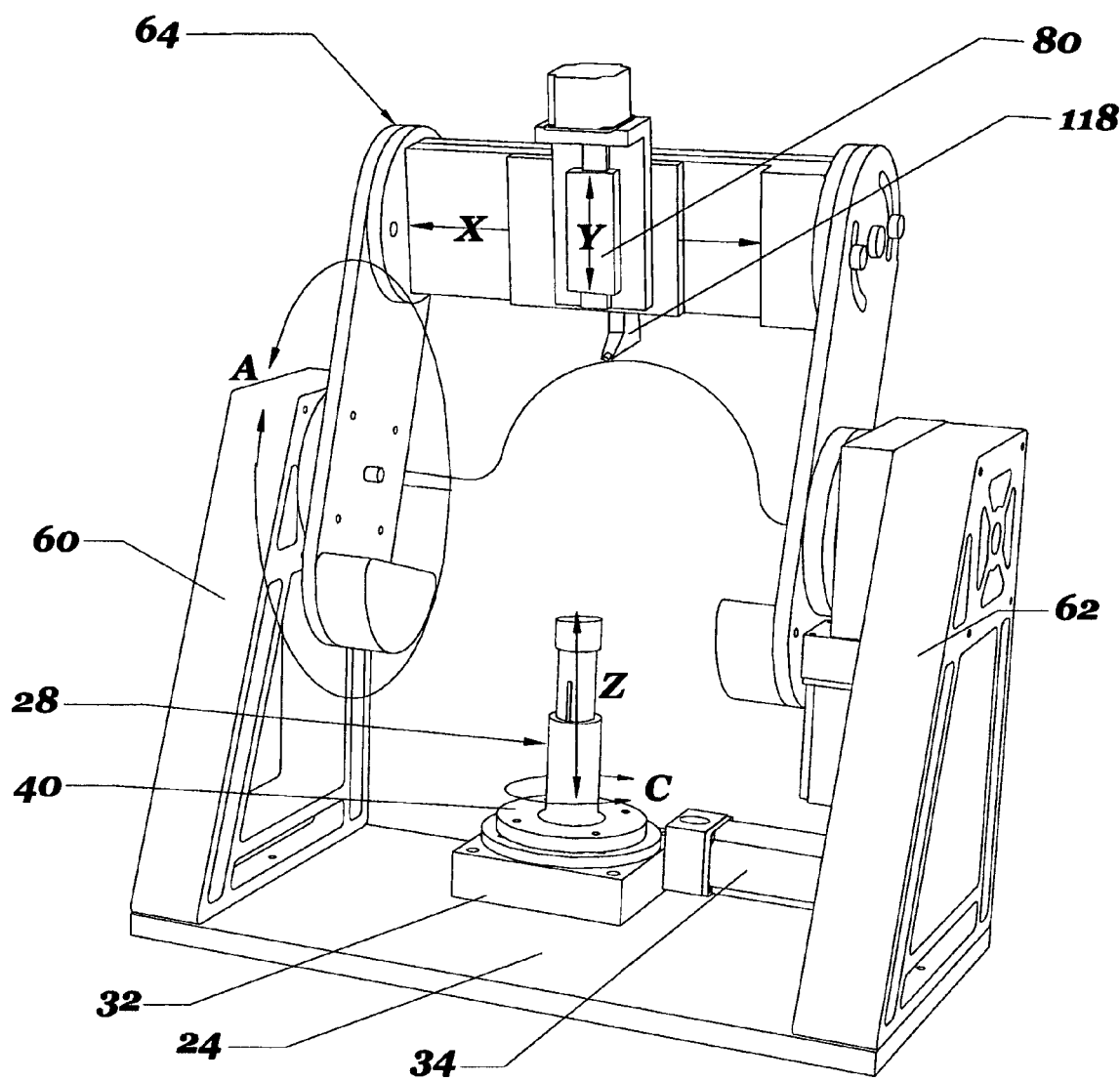

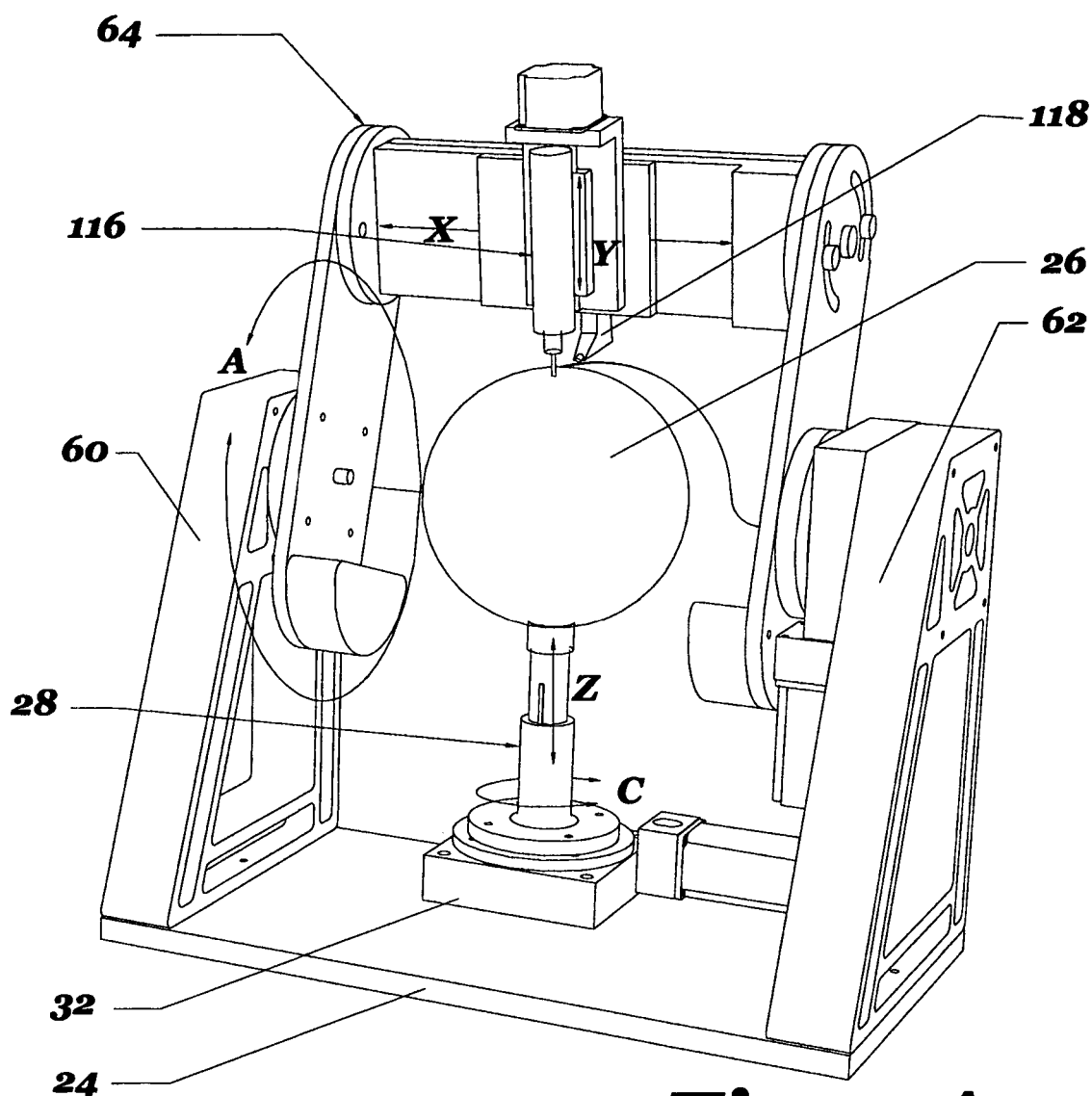
Fig. 1-A

Figure 2:
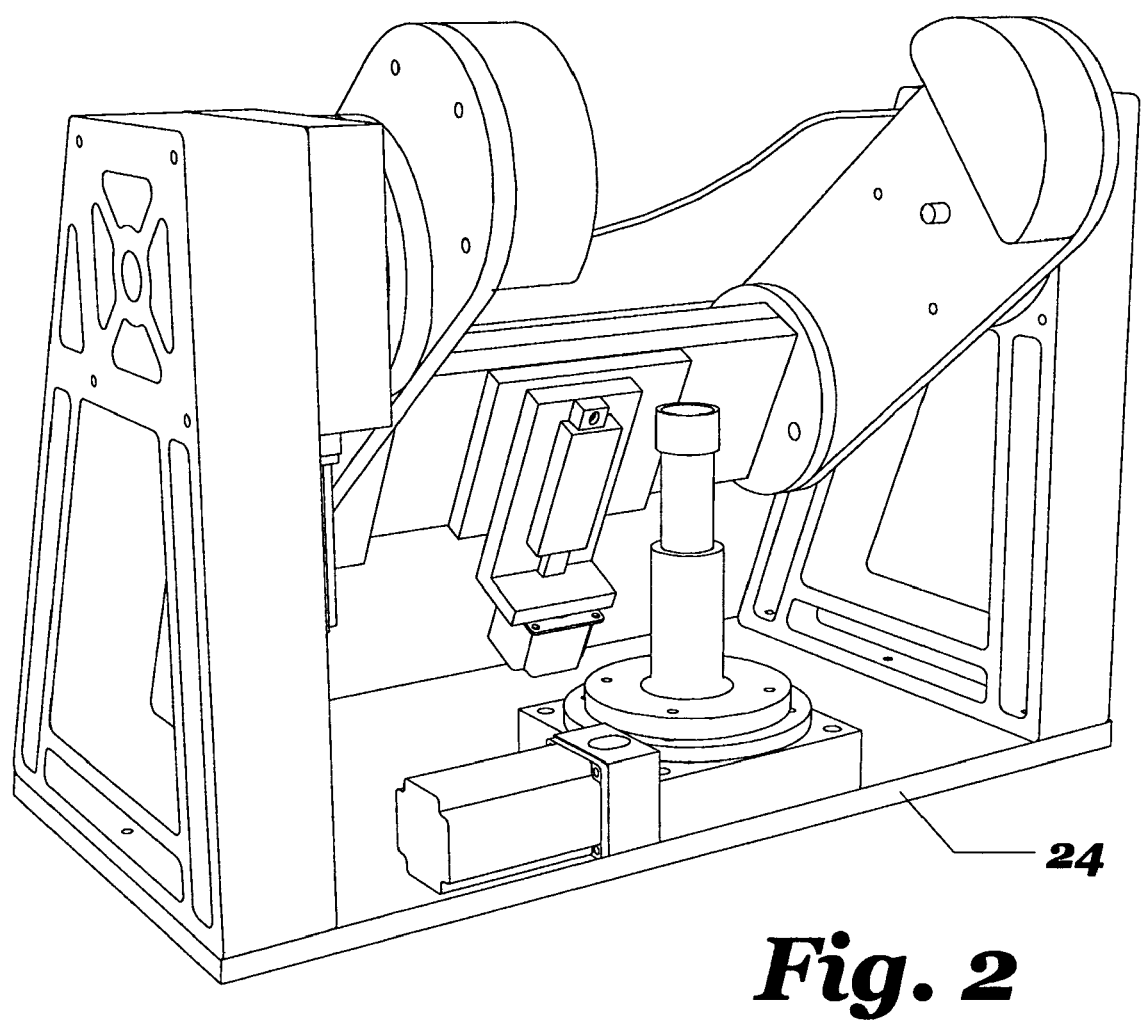

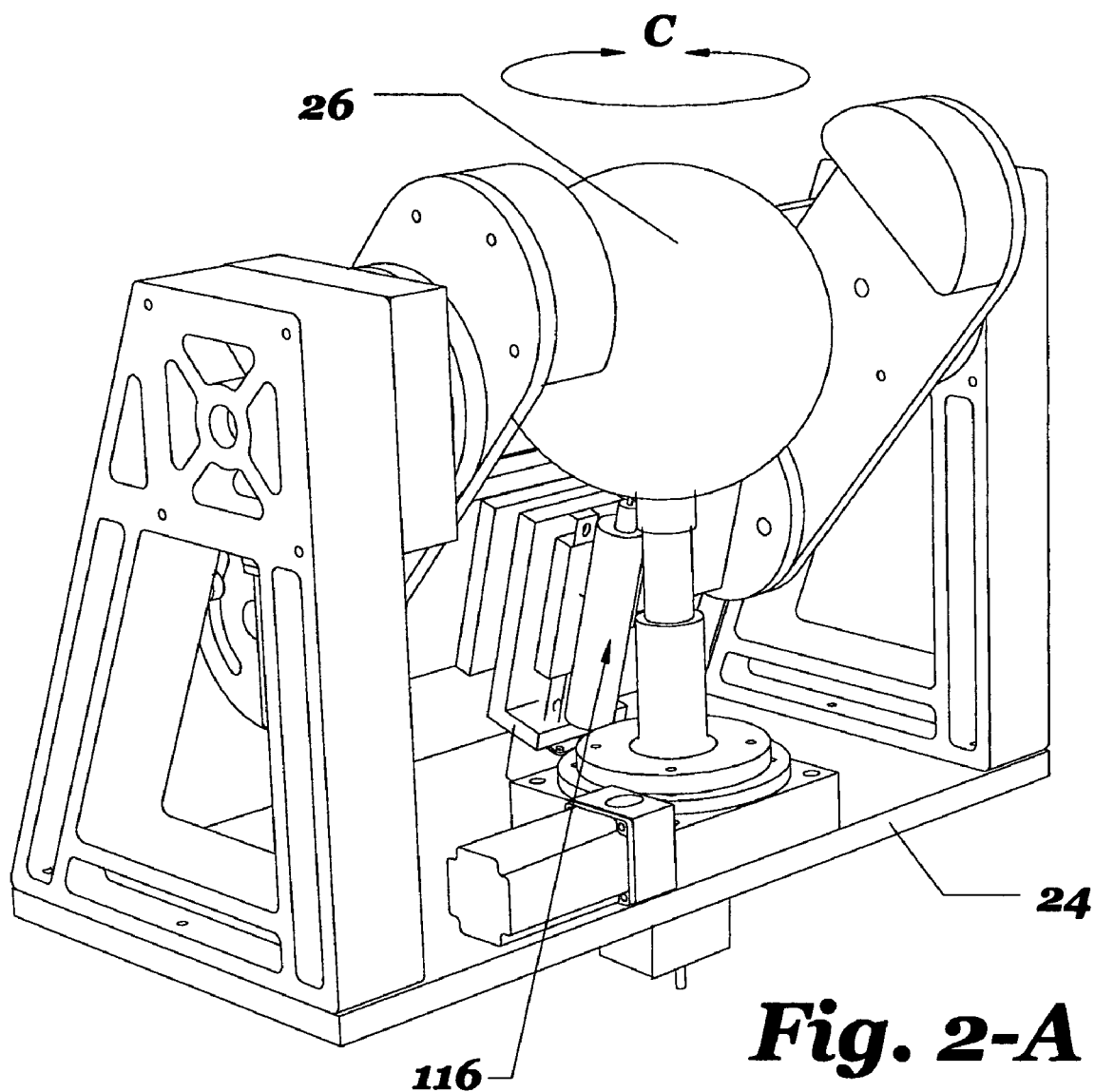
Fig. 2-A

Figure 5:
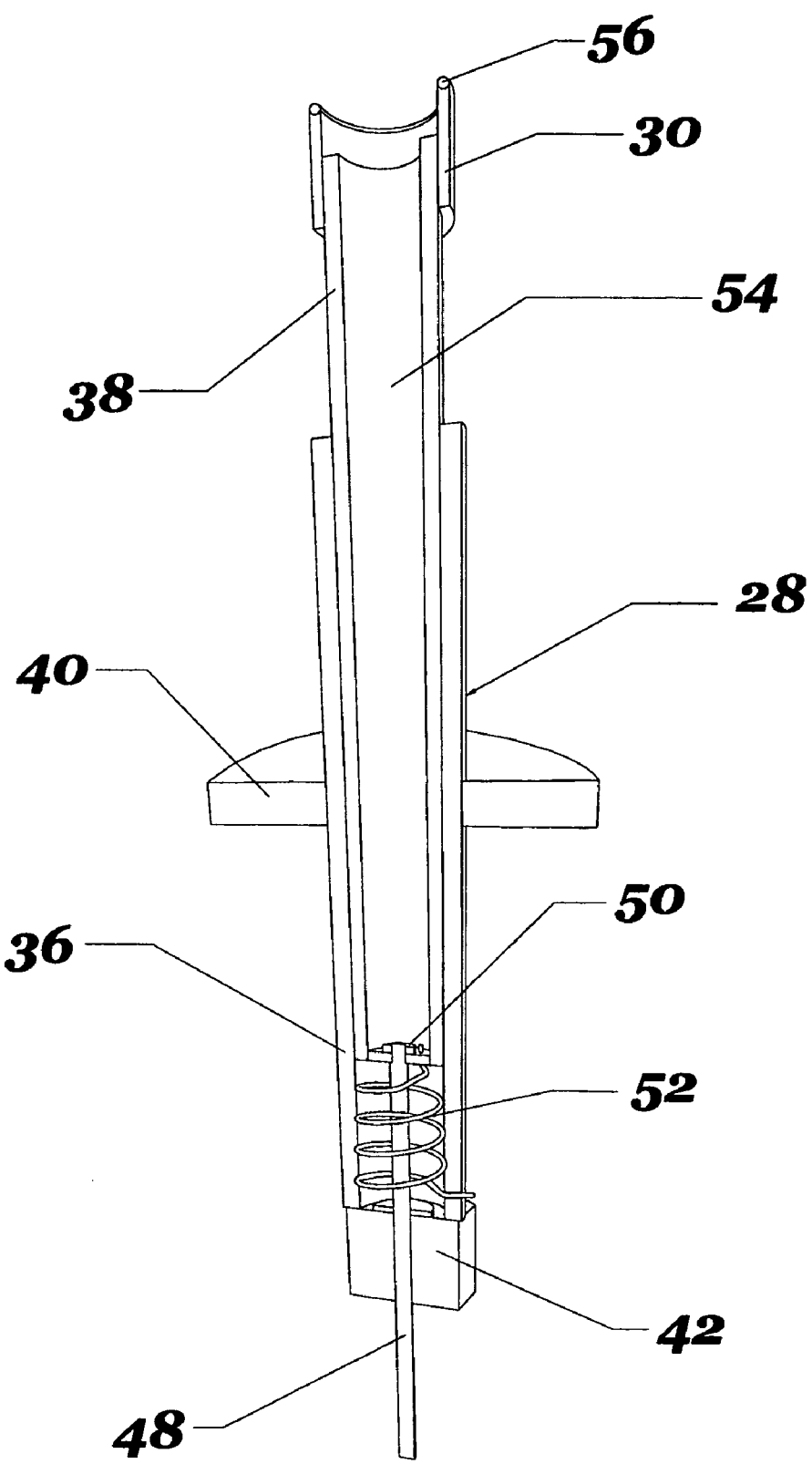

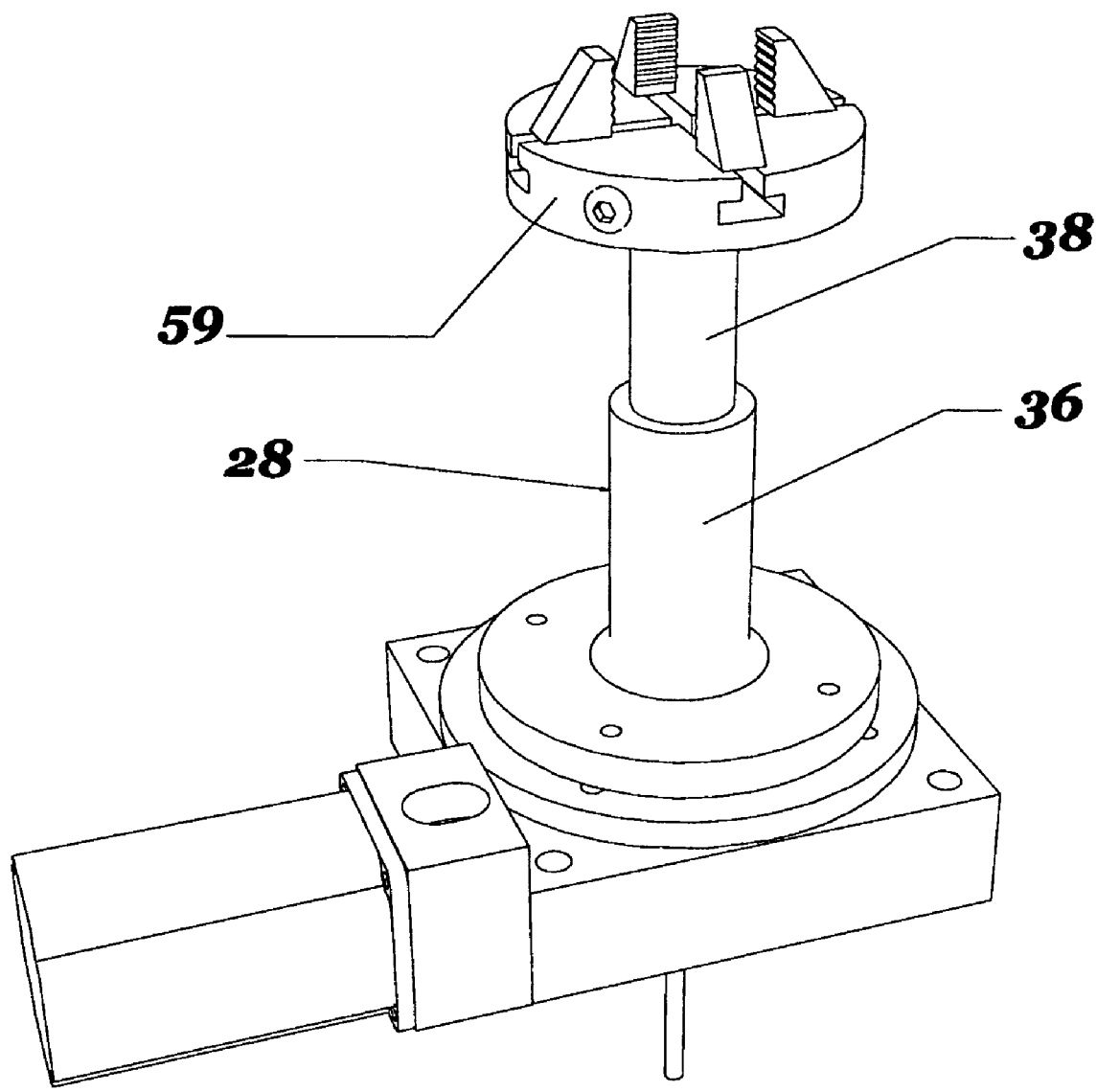
*Fig. 5-A*

Figure 14:
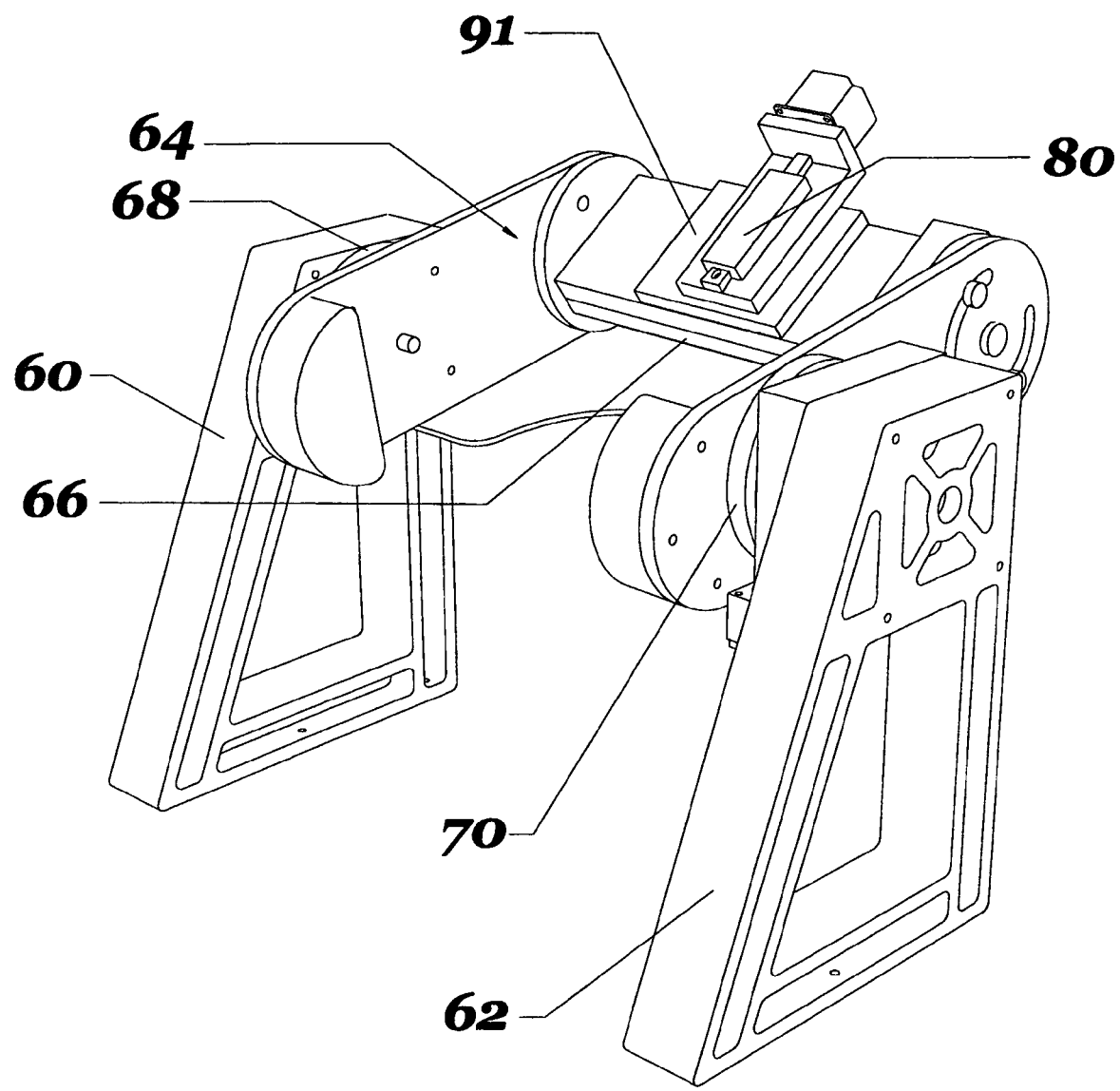

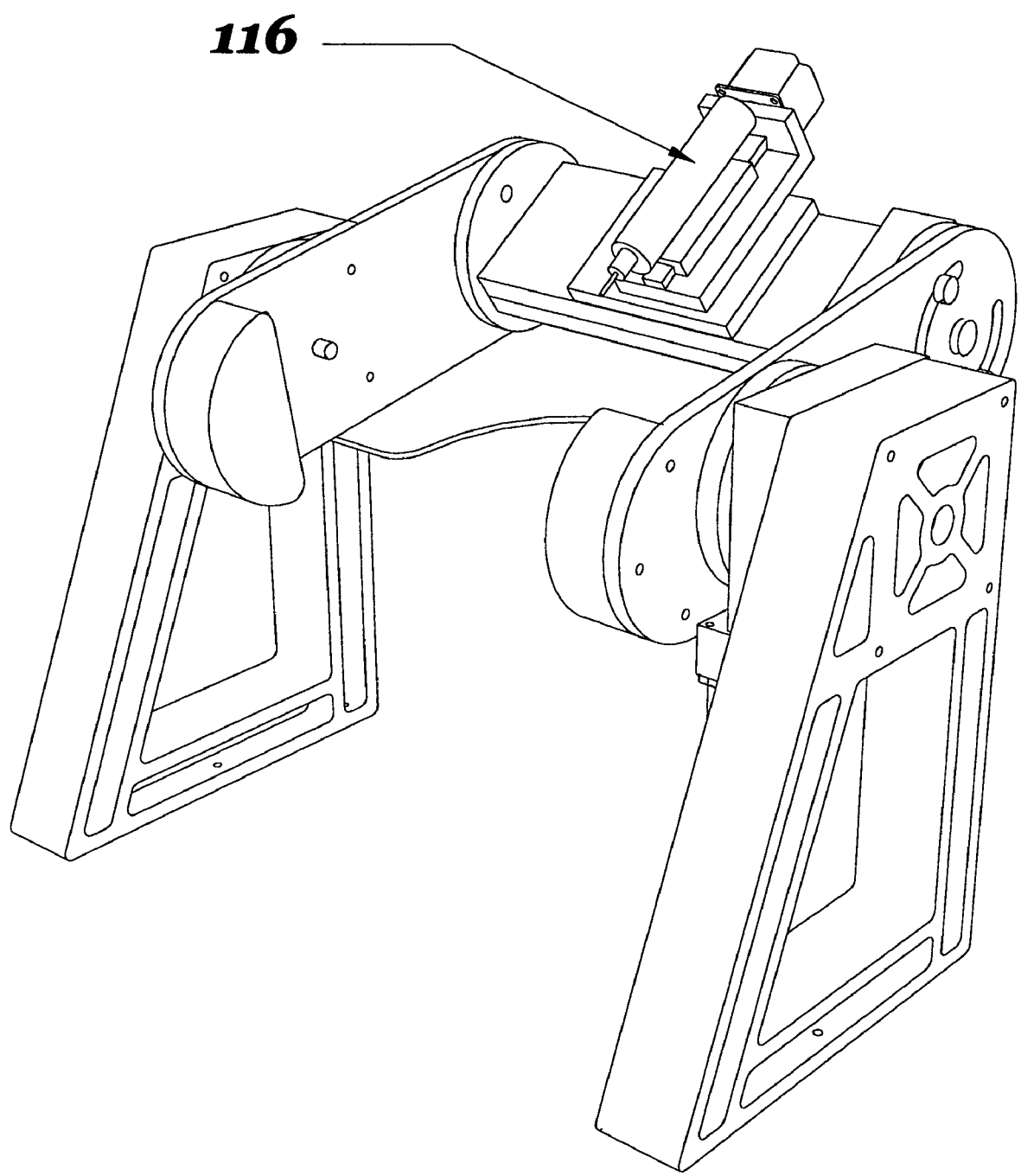
Fig. 14-A

MULTI-AXIS, PROCESSOR-CONTROLLED, TOOLHEAD POSITIONER

BACKGROUND OF THE INVENTION (1) Field of Invention

The present invention relates generally to devices for the accurate and repeated automatic or robotic control of the movement and positioning of a toolhead relative to the surface of a workpiece for carrying out computer-controlled programmed instructions for manufacturing operations.

(2) Description of Prior Art

The acronyms CNC and CAM stand respectively for Computer(ized) Numerical(ly) Control(led) and Computer Aided Manufacturing, and refers specifically to the computer control of machine tools for the purpose of (repeatedly) manufacturing complex parts in metal as well as other materials.

The introduction of CNC machines radically changed the manufacturing industry. Curves were as easy to cut as straight lines, complex 3-D structures were relatively easy to produce, and the number of machining steps that required human action diminished drastically.

In a production environment, all of these machines may be combined into one station to allow the continuous creation of a part involving several operations. CNC machines are driven directly from files created by CAD (Computer Aided design)/CAM software packages, so that an assembly or part can go from design to production without any intermediate paper drawing work being required. In one sense, CNC machines may be said to represent special industrial robot systems, as they are programmable to perform any kind of machining operation (within certain physical limits, like other robotic systems). CNC machines were relatively briefly preceded by the less advanced NC, or Numerical(ly) Control(led), machines.

A computer numerically-controlled (CNC) machine tool utilizes computer controlled motors in addition to the position feedback signals to precisely machine components. They may machine components using simultaneous multi-axis coordinated motion. Once the part program (computer software) is prepared, CNC machines can run unattended.

The machining objective loaded into the controller identifies the current operation as a positioning, contouring or pocketing operation. The machining constraints associated with the current objective are also loaded into the controller. These constraints may differ for each objective, as will be explained shortly. Position transducers (sensors) mounted on the machine tool issue position feedback signals which indicate their positions.

For contouring operations, a path constraint and a tolerance are specified by the machinist. This path may be in the form of a line/arc definition of the desired trajectory, a mathematical function or any other format that lends itself to manipulation by a computer. The tolerance value, identifying the locus of points that are within a known distance from the path movement, is used to establish the tolerance zone in which the tool motion is permitted. This information along with the position feedback signals is used, in part, to issue control signals to the motion switch means.

When a positioning operation of the tool is desired, the machinist enters a position constraint and tolerance constraint for each controlled axis collectively defining a target region. These constraints are used to issue control signals to the motion switch means based on the position feedback signals for each axis as transmitted by the position transducers.

Pocketing operations require the machinist to define boundary surface constraints and may include a tolerance or roughing distance. The "boundary surface constraints" define surfaces with which the tool is not permitted to come into contact and the "roughing distance" defines how close to the boundary surface constraints the tool is permitted to be moved. These constraints and the position feedback signals are used, in part, to issue control signals to the motion switch means, enabling and disabling the relative motion of the tool.

Computer-controlled carving machines, referred to as "CNC routers," have been commercially available for some time. CNC routers are expensive and large relative to the size of the workpiece that they can be employed to shape and rout.

CNC routers suffer from a number of deficiencies, in addition to large physical size relative to the maximally sized workpiece on which they can operate. First, the large bed required to support large workpieces adds considerably to the cost of CNC routers. The large bed size also adds considerable weight to the overall weight of CNC routers, since the large bed must be thickly cast or otherwise rigidly constructed to avoid sagging and other shape alterations. CNC routers require stiff and rigid components, because positional accuracy of the cutting head under computer control is possible only when x, y, and z translations of the cutting head predictably and reliably position the cutting head with respect to the bed, and the workpiece affixed to the bed. In general, CNC routers employ non-intuitive, and difficult-to-learn operator interfaces, and programming of CNC routers generally requires considerable training.

CNC routers, despite their disadvantages, have enormous usefulness in woodworking and in carving and shaping other rigid and semi-rigid materials. Wood workers, manufacturers, carpenters, artists, hobbyists, and others who carve and shape rigid and semi-rigid materials have thus recognized a need for a cheaper, smaller, lighter, and easier-to-use processor-controlled carving and shaping device.

A conventional vertical milling machine is equipped with a horizontal table for holding a workpiece, and a power-rotated cutter for machining the workpiece. The table and the cutting tool of a typical three-axis machine are adapted for relative longitudinal movement along a horizontal X-axis, relative lateral movement along a horizontal Y-axis, and relative vertical movement along a Z-axis. The cutting tool in such machines is typically positioned in a spindle in a vertical position, and in certain machines in a horizontal position or in an adapter for selecting either the vertical or horizontal position. In certain high-performance 4-axis machines, the cutting tool is located in a motorized spindle adapted for pivoting about a horizontal axis A, and in 5-axis machines, for rotation about a vertical axis C.

A conventional vertical turret lathe is equipped with a horizontal table mounted for continuous rotation of the workpiece about a vertical axis, and a non-rotating cutting tool typically positioned in a horizontal position. The table and cutting tool are typically adapted for relative positioning along the X and Z-axes for positioning of the workpiece on the table and machining of the rotating workpiece.

Numerous variations of milling machines and turret lathes are known in the art, as well as several machines that have attempted to merge the benefits of these two types of machines. One prior type of machine includes an adapter permitting removal of the turret lathe horizontal tool holder and installation of a milling vertical tool holding spindle to effect conversion from turret lathe operation to milling operation. Another prior type of machine provides for a turret lathe and a milling station in close proximity in the same machine to reduce transfer time between the two stations. Yet another type of vertical milling machine has been provided with a table mounted for rotation about a vertical axis and for swiveling about a horizontal axis.

However, these as well as other prior machines have failed to achieve an effective combination of the machining capabilities of milling machines and turret lathes, coupled with the necessary quick response times, such that the resultant machine is suitable for precision, high-speed CNC milling operations as well as general turning purposes of a conventional turret lathe.

It is conventional in the U.S. automotive industry to shape a complex workpiece, such as an engine block or head, by transferring such workpiece, clamped on a fixture and pallet, along a series of machining stations where a specific surface is cut or finished by a dedicated tool (or cluster of dedicated tools) fed along a unitary axis. The workpiece must be transferred, with time-consuming effort, to other fixtures and/or pallets to expose a variety of faces to the feed axis of the tools. The percentage of in-cut time exercised by such a system is low due to the frequency of low speed workpiece transfer and due to the slow rates of toolhead positioning. Each toolhead carries out a task dedicated solely to one machining function with little modification over several years of use. The initial cost of fabricating and installing such nonflexible dedicated equipment with complex controls is very high not only due to their sophistication but also due to the large number of single purpose cells needed to complete the shaping of a specific engine block or head.

While machining devices may be manually or computer-controlled, CNC milling machines are increasingly performing the greatest proportion of such milling tasks. Typical CNC milling machines have a machine spindle head with a rotating spindle shaft that handles a plurality of machining tools, including drills and many styles of chip removing cutters. When these CNC milling machines include a mechanism for exchanging of these chip-cutting tools, they are generally referred to as machining centers. These milling machines and machining centers are designed to produce a finished workpiece from the raw starting material as quickly and precisely as possible. Machines have been developed to operate as fast as possible, and milling tools are designed to efficiently remove large quantities of waste material through their cutting actions. When an exchange of tools is required, the interruption of the machining operation for the tool exchange function is typically so short that little time is added to that of actual machining.

The spindles on the most common CNC milling machines have either a vertical or horizontal orientation that sets the manner in which the milling cutters address the workpiece. It is obvious that workpieces may require milling from more than one side, and such workpieces require extra operations that may include repositioning of the workpiece on the machine's workpiece mount so that the cutters can address the other sides of the workpiece. This repositioning of the workpiece causes a loss of time and accuracy in the operations. Some milling machines have more than one tool-driving spindle, with secondary spindles being able to work on the same or other sides of the workpiece. Milling machines that have these secondary spindles are, however, of special and expensive construction, and as such are less common in the industry.

The most complex and expensive milling machines respond to these problems by the inclusion of mechanisms which tilt the spindle or the workpiece about one more axes, thus allowing the cutters to address the workpiece from more than one side. These complex machines, often called universal or 5-axis milling machines, while versatile in achieving many angles of milling, lose rigidity in the tilting mechanisms, accommodate relatively smaller workpieces, and must be constructed with great and costly care to achieve accuracy.

U.S. Pat. No. 4,146,966 to Levine et al., Apr. 3, 1979, discloses an engraving machine for rings with a rotating workpiece. The limited range of movement does not provide for movement in perpendicular rotational axes around the workpiece.

U.S. Pat. No. 4,848,942 to Speicher, Jul. 18, 1989, discloses a device utilizing impact pins to mark an arcuate surface. The limited range of movement does not provide for movement in perpendicular rotational axes around the workpiece.

U.S. Pat. No. 5,190,384 to Speicher, Mar. 2, 1993, discloses a dome and round parts rotary marker utilizing impact pins to mark an arcuate surface. The limited range of movement does not provide for movement in perpendicular rotational axes around the workpiece.

U.S. Pat. No. 5,203,088 to Morgan, Apr. 20, 1993, discloses a device for engraving an article with a curved surface (e.g., rings). The limited range of movement does not provide for movement in perpendicular rotational axes around the workpiece.

U.S. Pat. No. 6,145,178 to Green, Nov. 14, 2000, discloses a milling machine with horizontal and vertical spindles. The limited range of movement does not provide for movement in the rotational axes around the workpiece.

U.S. Pat. No. 6,502,002 B2 to Susnjara et al., Dec. 31, 2002, discloses a multi-purpose, flexible CNC machine for performing a variety of machining operations on all parts of a product. It does not provide for six degrees of freedom of movement utilizing only five axes of movement.

OBJECTS AND ADVANTAGES

It is an object of the present invention to provide a computer numerically-controlled (CNC) positioning device and platform for numerous types of toolhead assemblies.

It is an object of the present invention to offer a platform for a smaller, less expensive, lighter, and easier-to-use CNC router and milling machine.

It is an object of the present invention to offer a platform, outfitted with the appropriate toolhead assembly, to automatically and rapidly size and machine a sphere to a precise diameter, using only two degrees of freedom, that of two perpendicular rotational axes.

It is an object of the present invention to offer a platform, outfitted with the appropriate toolhead assembly, to automatically and rapidly size and machine an elliptical object (e.g., egg-shaped object) to a precise diameter, width, height, and elliptical arc, utilizing three degrees of freedom.

It is an object of the present invention to offer a platform, outfitted with the appropriate toolhead assembly, to automatically and rapidly mill various textures or 3D reliefs onto the surface of a sphere or some other arcuate surface.

It is an object of the present invention to offer a platform, outfitted with the with the appropriate toolhead assembly, to engrave or print photographs, text, or patterns onto the surface of a sphere or some other arcuate surface.

Advantages of this invention over prior art include the following:

(1) The invention addresses and concentrates on the positioning and platform aspect of a machining device, rather than the toolhead assembly, creating incredibly greater flexibility in function of the invention.

(2) It provides a platform for an improved machining device for the high-speed milling of certain parts which previously could only be manufactured by other less efficient methods, so as to reduce total manufacturing time, and increase machining accuracy.

(3) It provides a platform for an effective combination of the machining capabilities of high-speed CNC milling operations with that of the general turning purposes of a conventional turret lathe, coupled with quick response times of CNC machines.

(4) It provides a platform for a smaller, less expensive, lighter, and easier-to-use CNC router.

(5) It provides a platform for the recognized need for a cheaper, smaller, lighter, and easier-to-use processor-controlled carving and shaping device.

SUMMARY OF THE INVENTION

The present invention is a multi-axis, processor-controlled, toolhead positioning device. It is unique and novel in design and purpose by providing a toolhead positioning device with six degrees of freedom of movement, using only five axes, in a new and innovative configuration. It is also unique and novel in providing a toolhead assembly base for mounting different toolhead assemblies to the invention. The invention is a computerized numerically-controlled (CNC) positioning device for a myriad of toolhead types. Although typical uses come to mind immediately such as milling, routing, and engraving operations, the present invention can also be used to calculate the surface area of a workpiece, print photo images onto an arcuate surface, or perform welding operations; the invention is not limited to machining operations per se. These are simply a few examples for illustrating the capabilities of the present invention. As a toolhead positioning device, the potential uses are limited only by the number of different toolhead assemblies in the world and one's imagination. The multi-axis, processor-controlled, toolhead positioning device is fully scalable and can be adapted to many various sizes, depending on the toolhead assembly mounted to the invention. Those skilled in the art will recognize the numerous toolhead configurations possible with such a toolhead assembly platform. A specific toolhead assembly does not define the invention; it enhances it.

Degrees of freedom describe the motion of an object in 3-dimensional space. An object in three-dimensional space has six degrees of freedom: three linear coordinates for defining the position of its center of mass, or any other its point, and another three Euler angles defining relative rotation around the body's center of mass. Two main groups describing such degrees of freedom include (1) translation, and (2) rotation. Translation is the ability to move in three dimensions in an X-Y-Z linear coordinate system, while rotation is the ability to change angles around an axis. To break down the six degrees of freedom that an object might possess in 3-dimensional space, each of the following is one degree of freedom: (1) moving up and down (heaving), (2) moving left and right (swaying), (3) moving forward and backward (surging), (4) tilting up and down (pitching), (5) turning left and right (yawing), and (6) tilting side to side (rolling). Directions such as right, left, up, down, front, and back are described as viewed by an individual standing in front of and facing the invention.

In the multi-axis, processor-controlled, toolhead positioning device, the linear motion up and down (heaving) is achieved through the vertical movement of the workpiece mount in a linear Z-axis. The linear motion left and right (swaying) is achieved through the horizontal sliding movement of the toolhead assembly base (mounted on top of the X-axis carriage) in the longitudinal X-axis. The sliding movement forward and backward of the toolhead assembly base along the transverse Y-axis illustrates the remaining linear motion of moving forward and backward (surging).

The rotational movement of the workpiece mount provides the first rotational degree of freedom, that of turning left and right (yawing). This is the rotation of the workpiece mount about the vertical Z-axis or preferably, in the rotational C-axis. The rotational movement of the gantry about the longitudinal X-axis (or preferably, in the rotational A-axis) above and around the workpiece, perpendicular to the rotational C-axis of the rotating workpiece, effectively creates the tilting up and down movement (pitching) relative to the workpiece, constituting a second rotational degree of freedom. These five movements (three linear and two rotational) provide five degrees of freedom. However, by combining the rotational movement of the workpiece mount (and its secured workpiece) with the rotational movement of the gantry about and around the workpiece, the remaining third rotational degree of freedom, that of tilting side to side (rolling), is achieved.

As the multi-axis, processor-controlled, toolhead positioning device's design and concept are its unique features, the previous listed prior art most certainly relates more to a desired ramification than the preferred embodiment.

DESCRIPTION OF THE DRAWINGS (1) FIG. 1 is a perspective frontal view of the invention showing an elevated gantry.

(2) FIG. 1A is a perspective frontal view of the invention showing an elevated gantry along with a workpiece and mounted toolhead assembly.

(3) FIG. 2 is a perspective rear view of the invention showing a lowered gantry.

(4) FIG. 2A is a perspective rear view of the invention showing a lowered gantry with a workpiece and mounted toolhead assembly.

Figure 3:
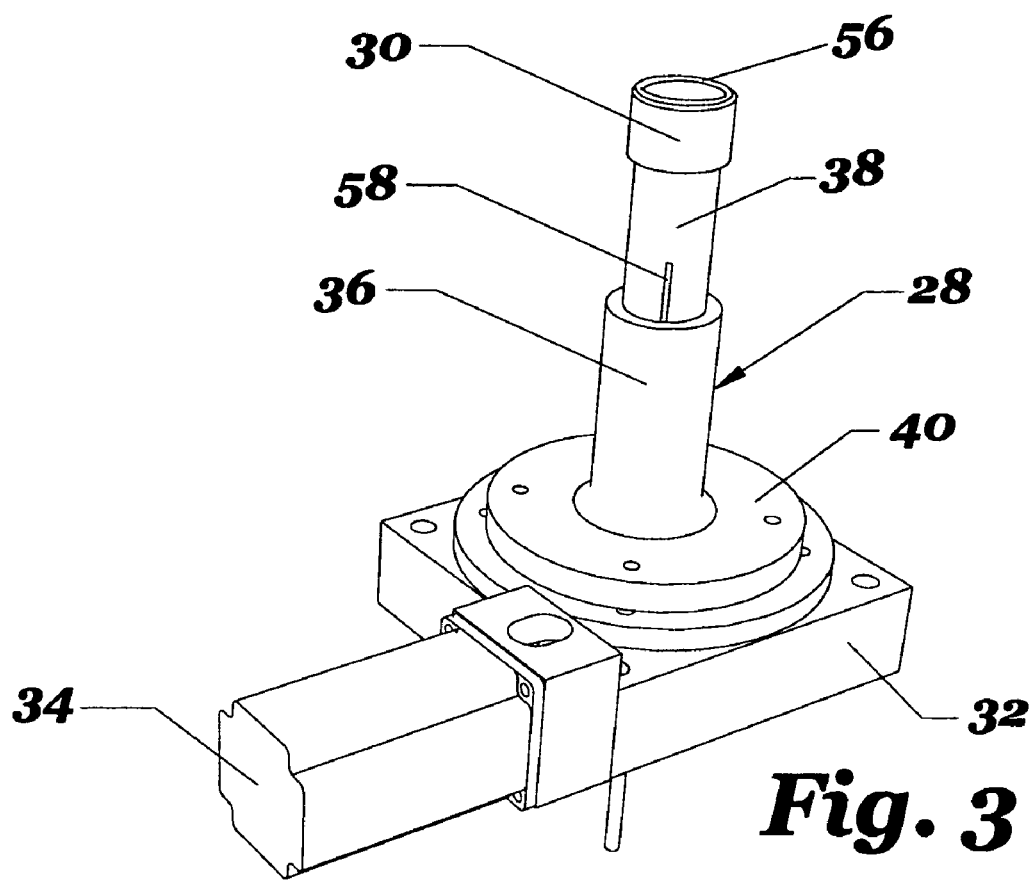

(5) FIG. 3 is a perspective view of the work piece mount assembly and rotary table.

Figure 4:
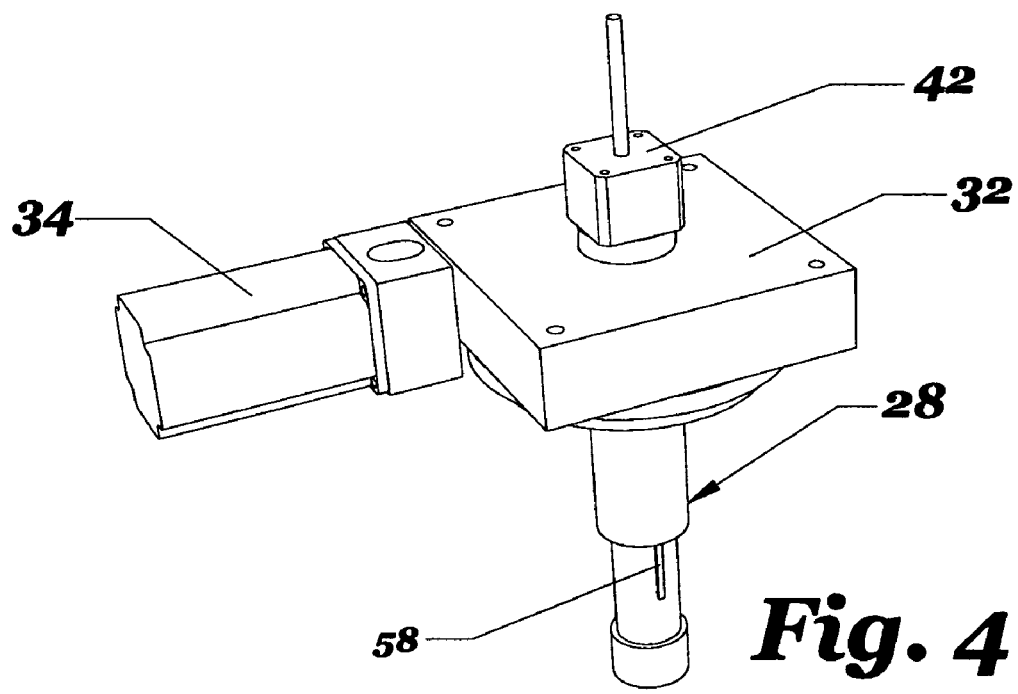

(6) FIG. 4 is a perspective bottom view of the work piece mount assembly and rotary table.

(7) FIG. 5 is a cross-sectional view of the work piece mount assembly with a vacuum securing system.

(8) FIG. 5A is a perspective view of the work piece mount assembly with a mechanical clamping attachment.

Figure 6:
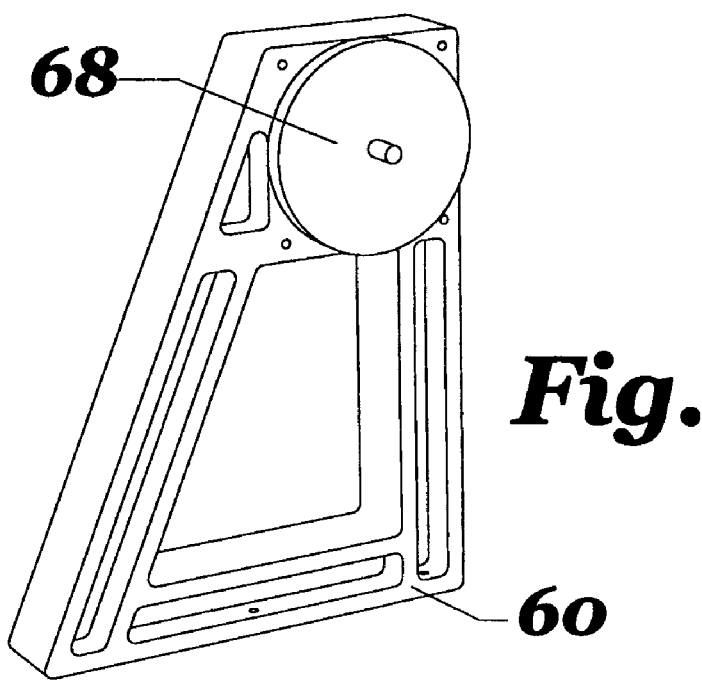

(9) FIG. 6 is a perspective view of the left-hand side (when viewed from the front) support arm with a rotating plate.

Figure 7:
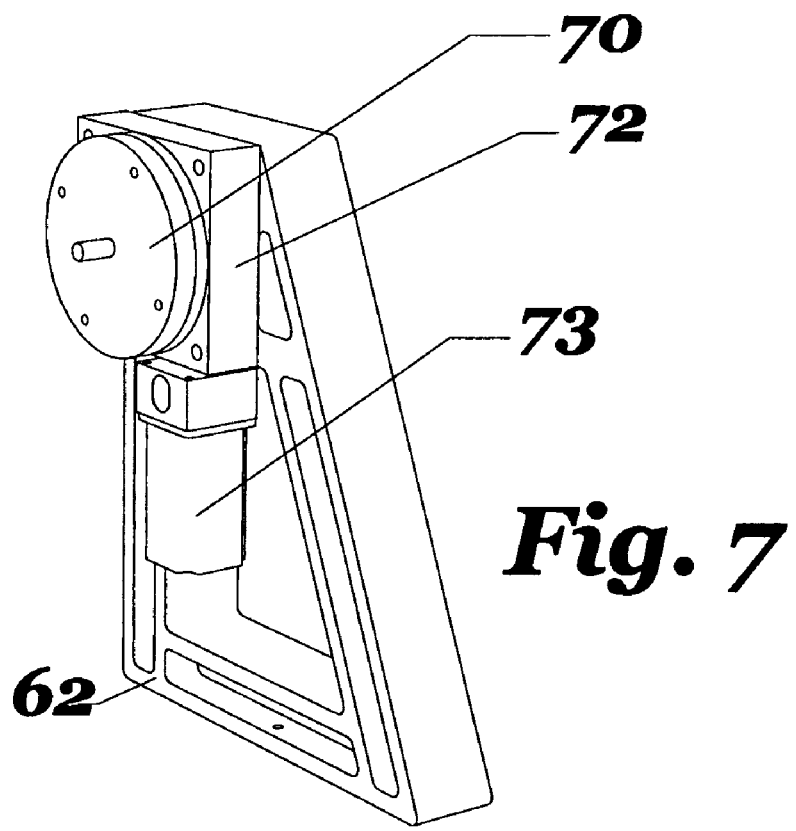

(10) FIG. 7 is a perspective view of the right-hand side (when viewed from the front) support arm with a rotary table and rotating plate.

Figure 8:
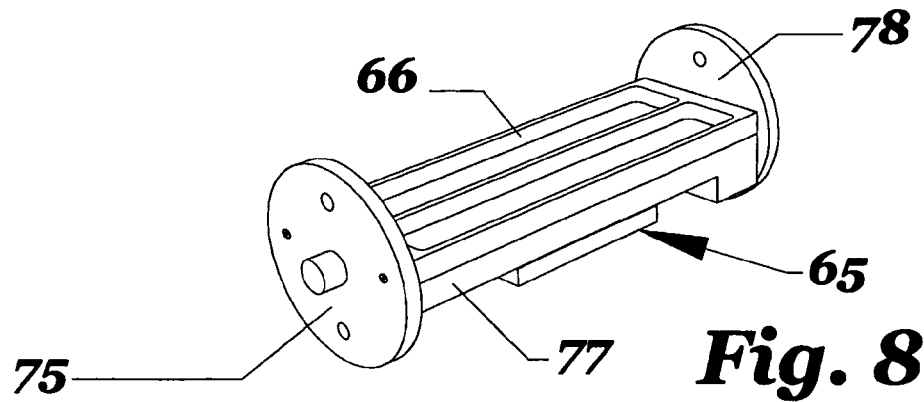

(11) FIG. 8 is a perspective bottom view of the gantry bridge assembly.

Figure 9:
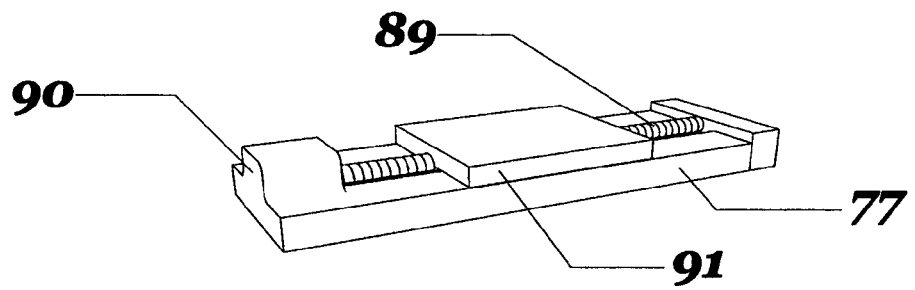

(12) FIG. 9 is a perspective view of the X-axis mounting plate with an X-axis carriage.

Figure 10:
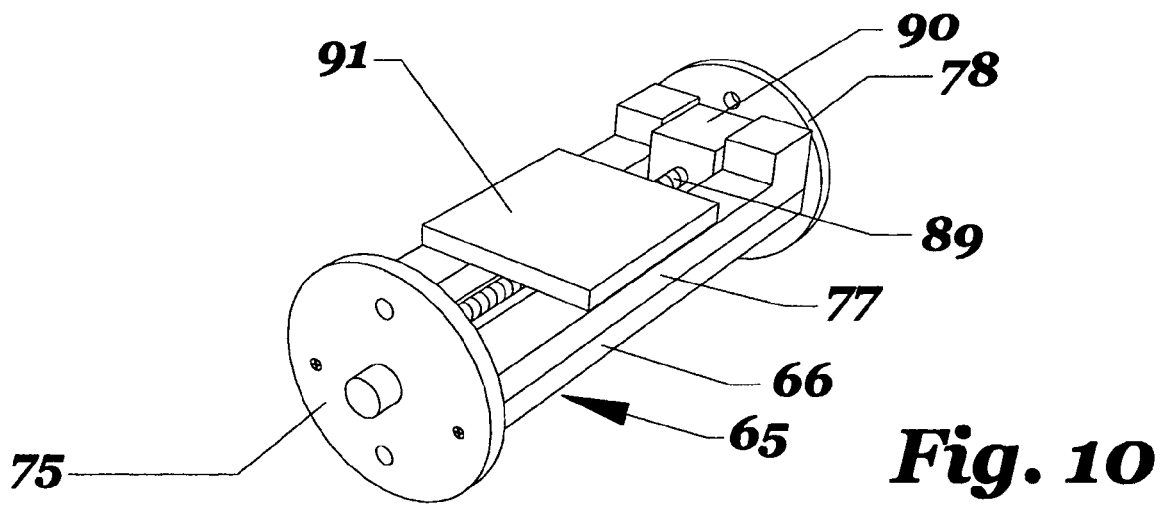

(13) FIG. 10 is a perspective top view of the gantry bridge assembly with an X-axis carriage.

Figure 11:
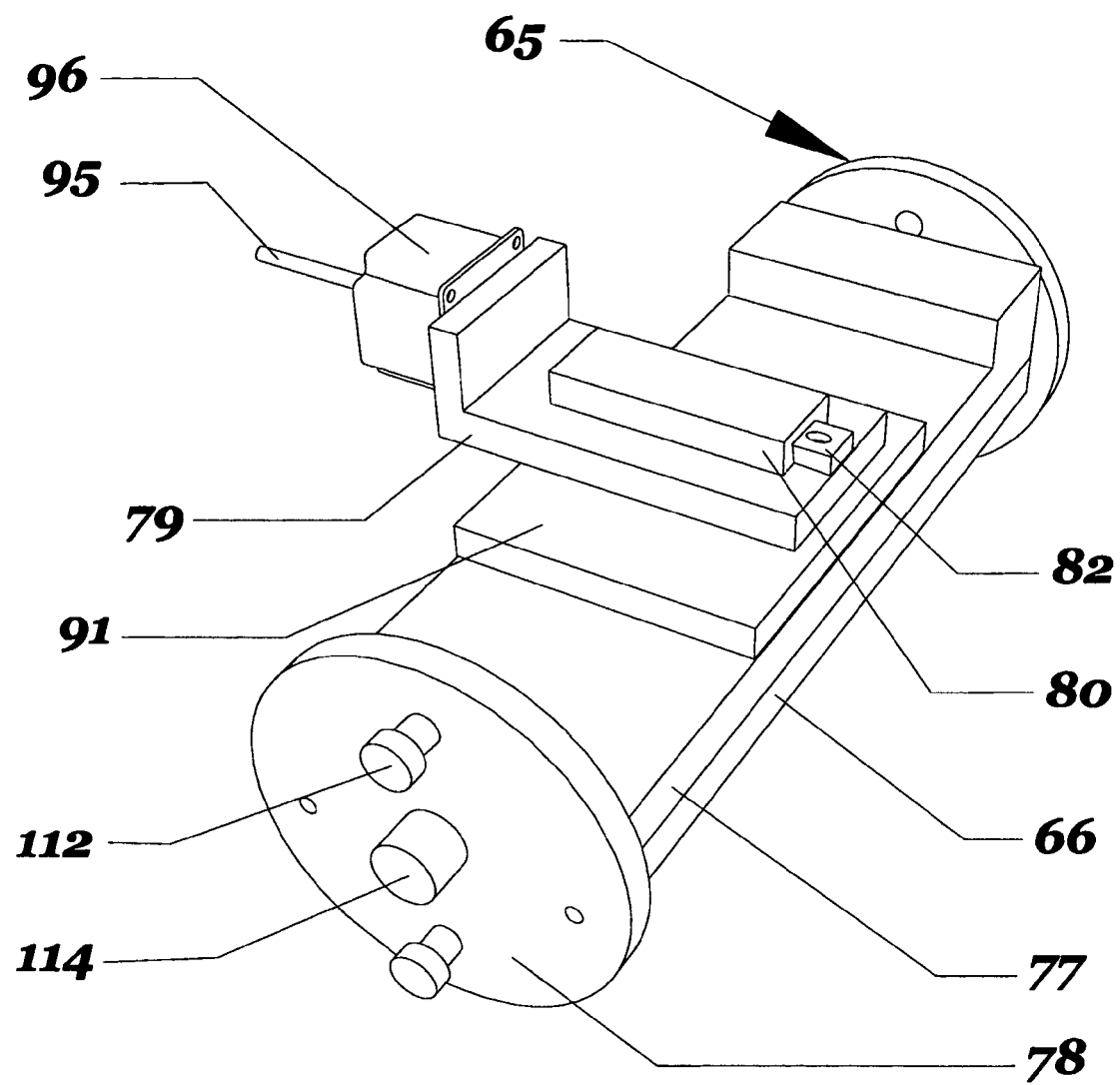

(14) FIG. 11 is a perspective view of an X-axis carriage and a toolhead assembly base.

Figure 11A:
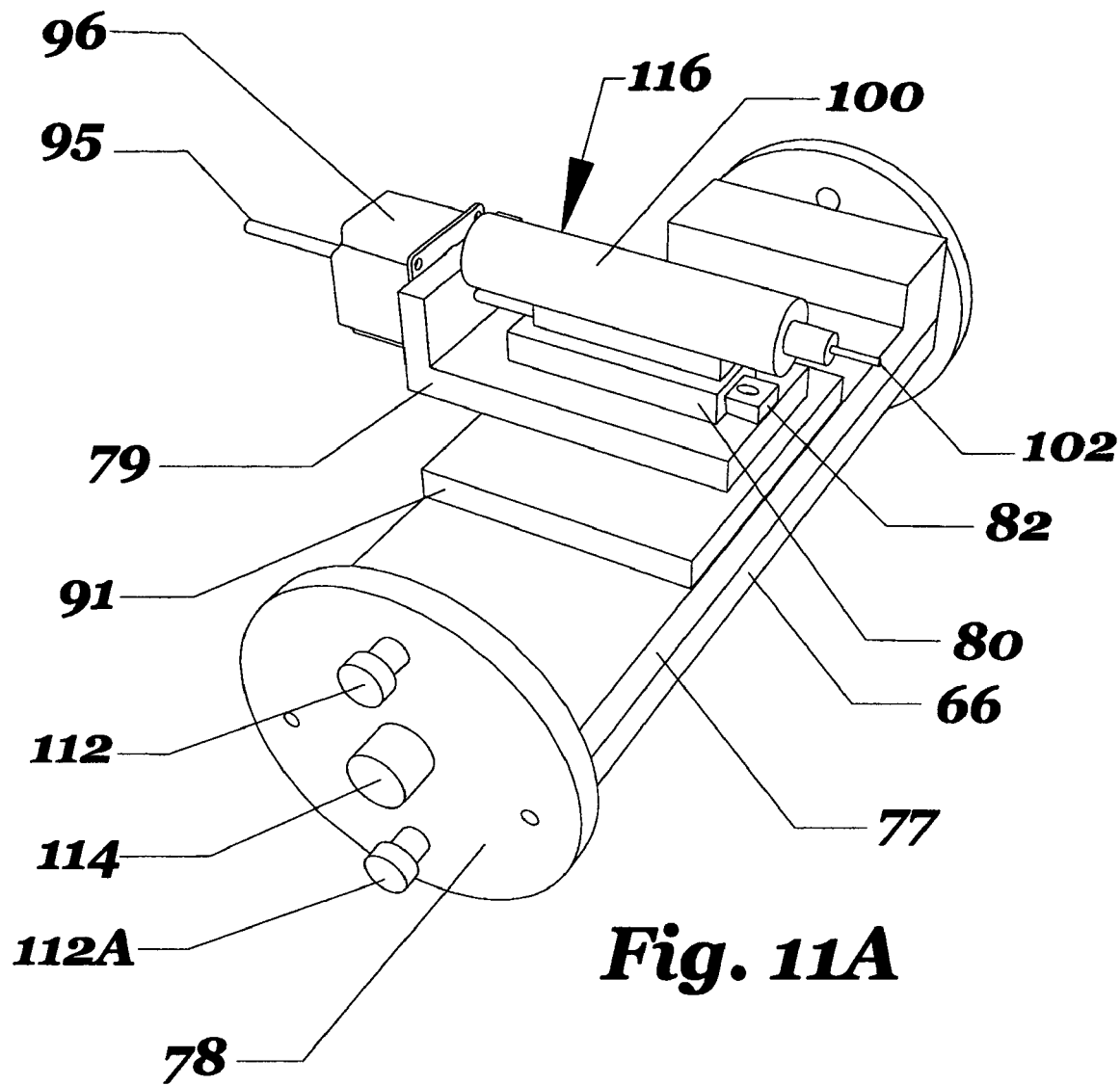

(15) FIG. 11A is a perspective view of an X-axis carriage and a toolhead assembly base, with a mounted toolhead assembly.

Figure 12:
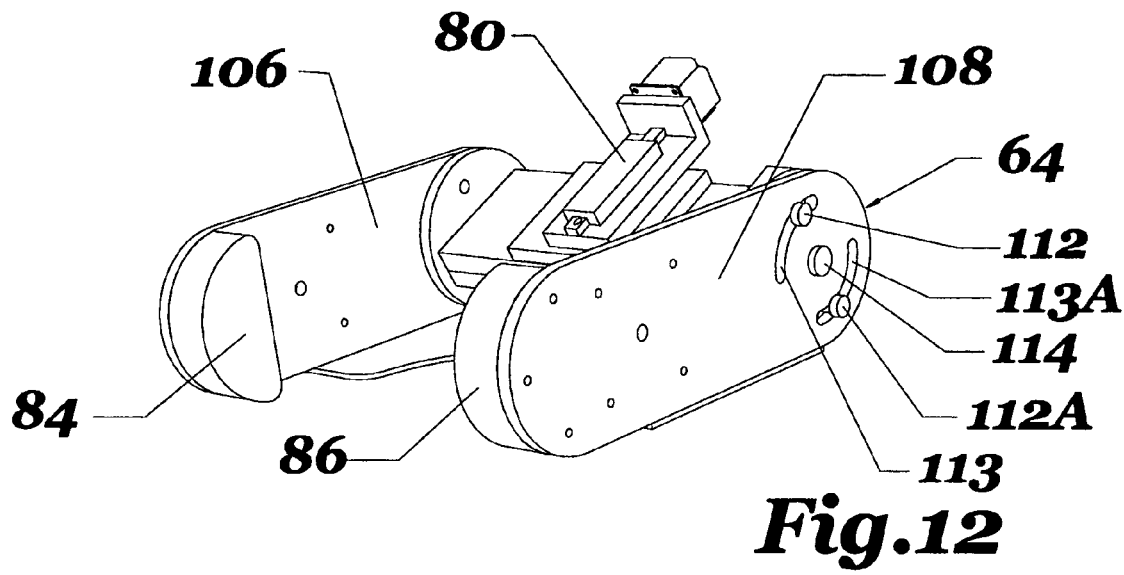

(16) FIG. 12 is a perspective front and side view of the gantry and tool head assembly base.

Figure 13:
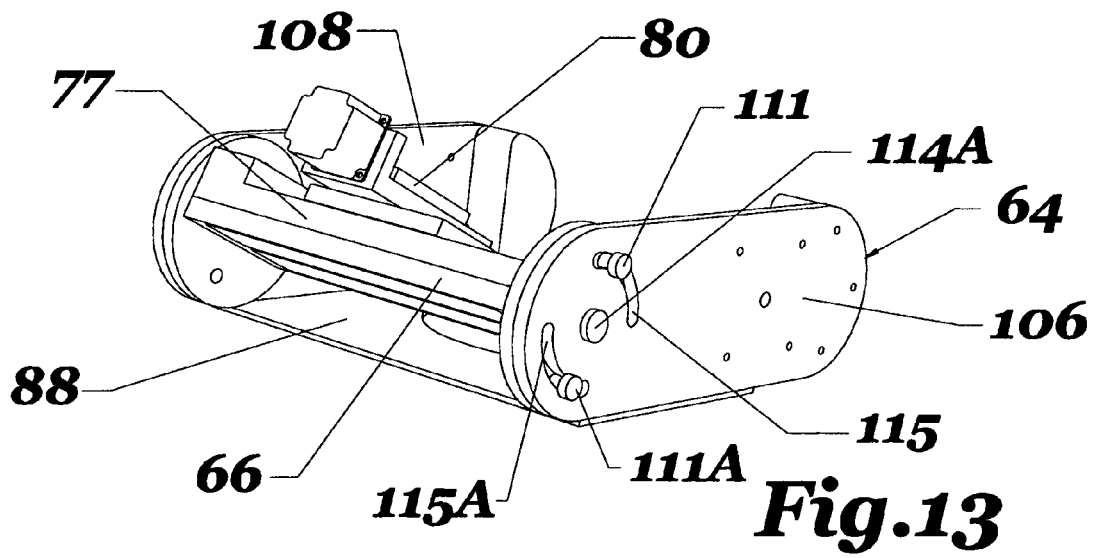

(17) FIG. 13 is a perspective rear and side view of the gantry and tool head assembly base.

(18) FIG. 14 is a perspective frontal view of the gantry rotatably mounted to a pair of support arms.

(19) FIG. 14A is a perspective frontal view of the gantry rotatably mounted to a pair of support arms with a mounted toolhead assembly.

Figure 15:
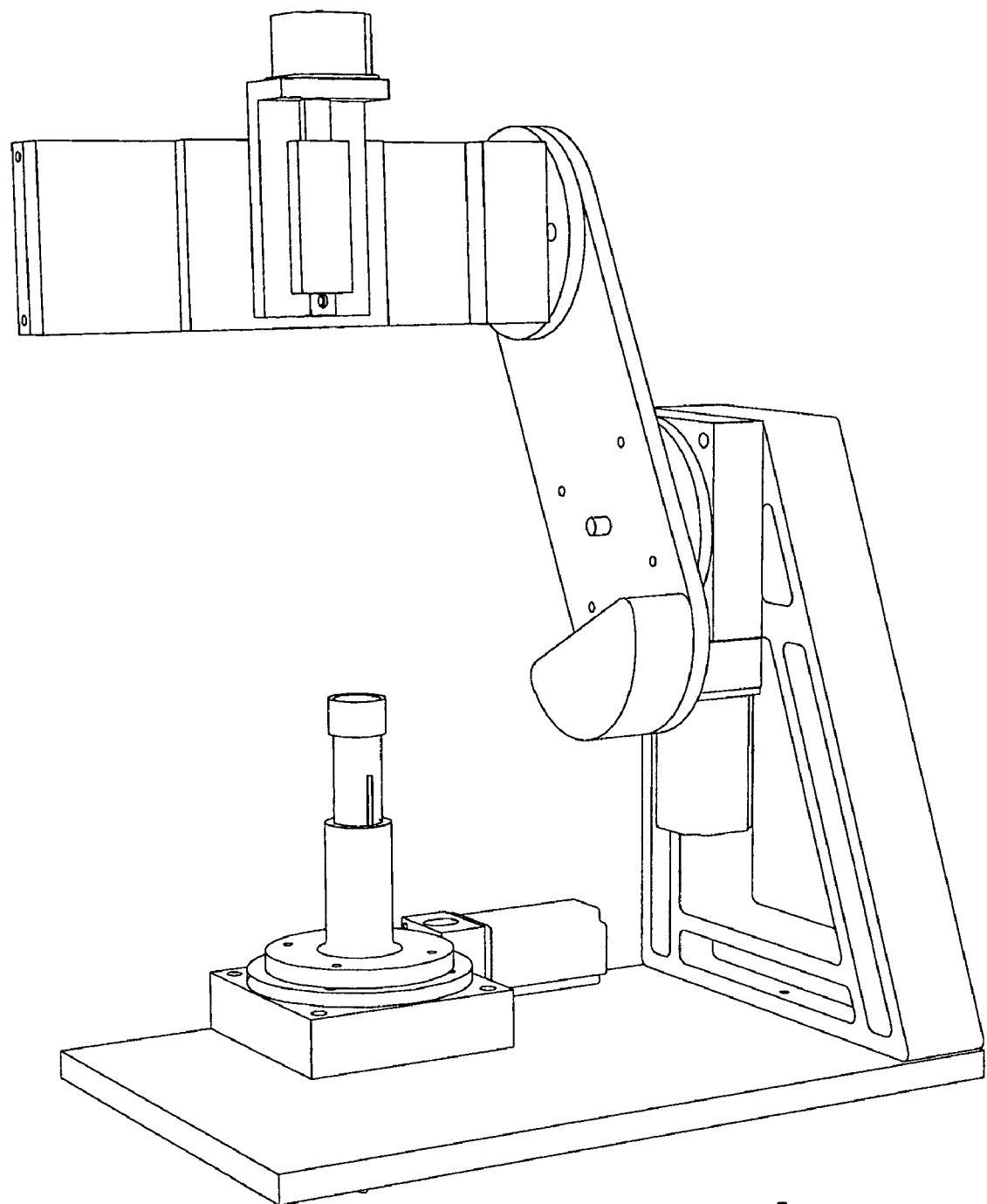

(20) FIG. 15 is a perspective view of the invention with one support arm.

Figure 16:
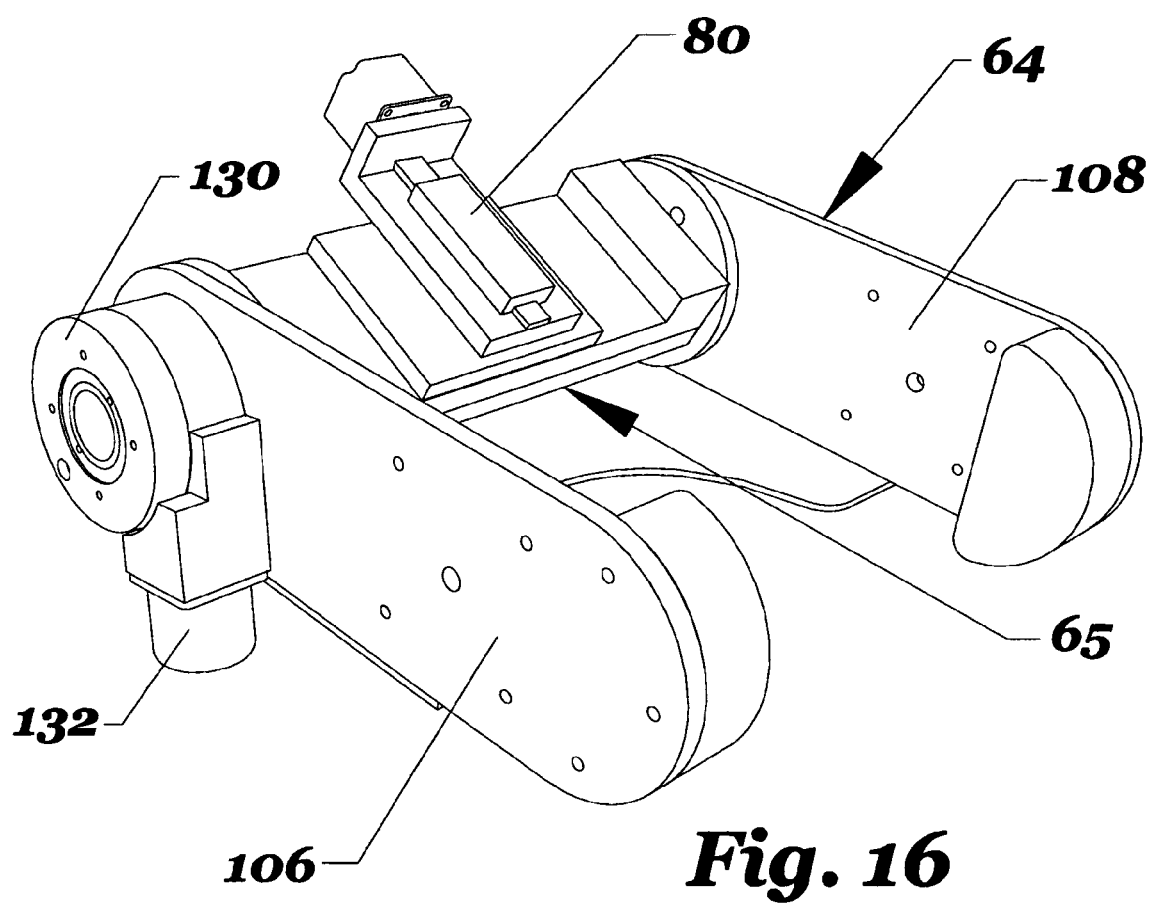

(21) FIG. 16 is a perspective view of the gantry with a rotary table attached to a gantry arm.

Figure 17:
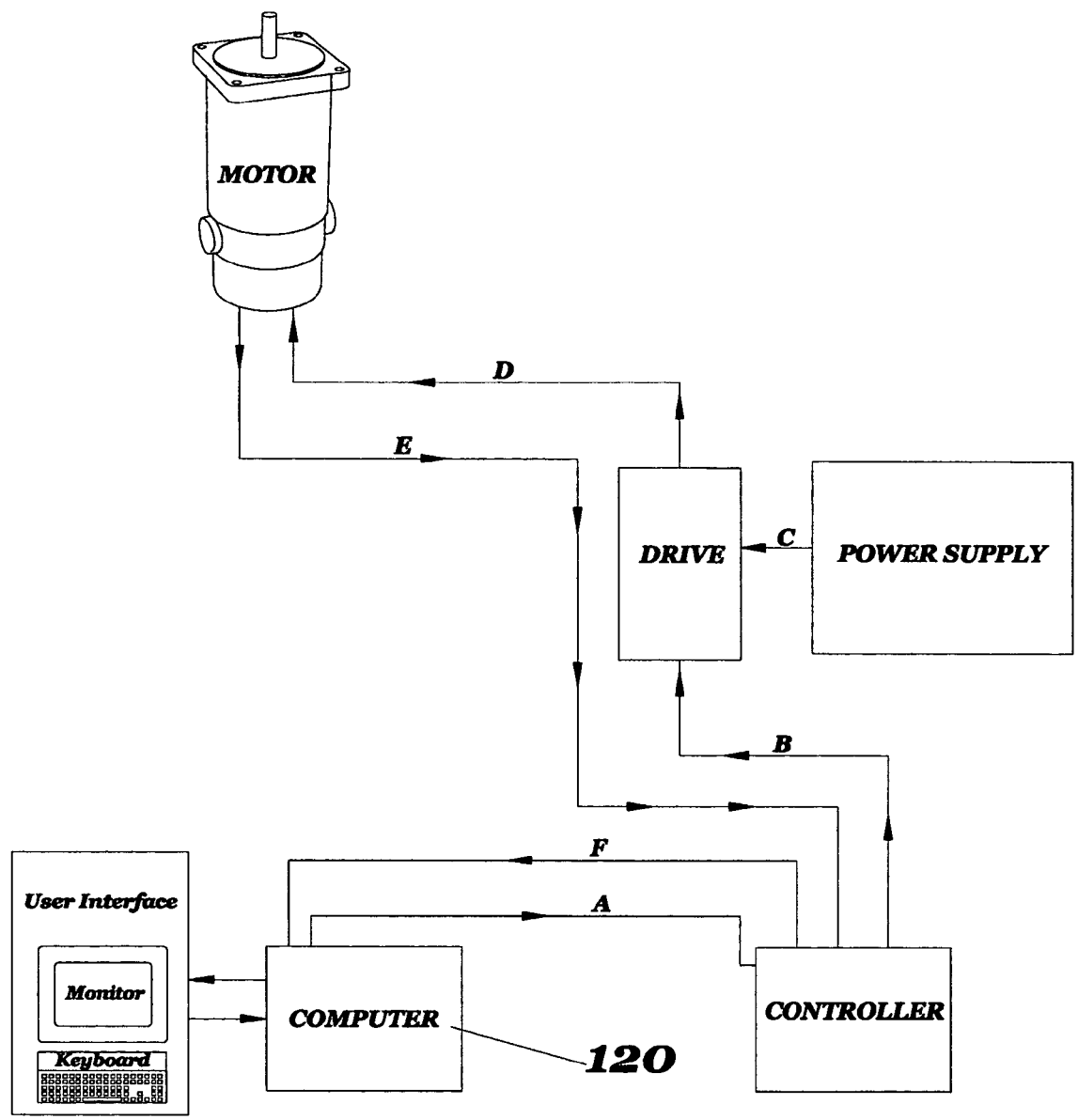

(22) FIG. 17 is a schematic block diagram of computer-controlled events.

LIST OF DRAWING REFERENCE NUMBERS

24—Base plate
26—Workpiece
28—Workpiece mount assembly
30—Workpiece mount
32—First rotary table
34—First rotary motor
36—Support tube
38—Translating tube
40—Support tube mounting bracket
42—First linear motor
48—Translating screw
50—Retaining nut
52—Vacuum line
54—Vacuum chamber
56—Elastic grommet
58—Keyway
59—Clamping device
60—First vertical support arm
62—Second vertical support arm
64—Gantry
65—Gantry bridge assembly
66—Gantry bridge
68—First rotating plate
70—Second rotating plate
72—Second rotary table
73—Second rotary motor
75—First mounting disc
77—X-axis mounting plate
78—Second mounting disc
79—Carriage mounting bracket
80—Toolhead assembly base
82—Y-axis carriage guide rail
84—First counter weight
86—Second counter weight
88—Stiffener plate
89—X-axis leadscrew
90—Second linear motor
91—X-axis carriage
95—Y-axis leadscrew
96—Third linear motor
100—Toolhead holder
102—Toolhead
106—First gantry arm
108—Second gantry arm
111—Mounting bolt
111A—Mounting bolt
112—Mounting bolt
112A—Mounting bolt
113—Mounting bolt slot
113A—Mounting bolt slot
114—Rotation pin
115—Mounting bolt slot
115A—Mounting bolt slot
116—Toolhead assembly
118—Contact switch
120—Computer
130—Third rotary table
132—Third rotary motor

DETAILED DESCRIPTION OF THE INVENTION (1) Preferred Embodiment

A preferred embodiment of the multi-axis, processor-controlled, toolhead positioning device is illustrated in FIG. 1 and FIG. 2. FIG. 1 shows a perspective view of the front of the invention illustrating a workpiece mount assembly 28, an elevated gantry 64, and the linear and rotational axes of movement. FIG. 2 shows a perspective view of the rear of invention again illustrating the workpiece mount assembly 28, but showing the gantry 64 in a lowered position. As the invention is described, directions such as right, left, up, down, front, and back are as viewed by an individual standing in front of and facing the invention. The linear and rotational axes of movement referred to throughout this specification are described in greater detail in the summary.

The major components of the multi-axis, processor-controlled, toolhead positioning device are illustrated in FIG. 1. They comprise the following: a base plate 24, a rotating and elevating workpiece mount assembly 28, vertical support arms 60, 62, a rotating gantry 64, and a slidable toolhead assembly base 80. The computer 120, which is vital to the operation of the invention, is not shown in FIG. 1. FIG. 17 is the only figure that addresses the computer, by providing a schematic block diagram of the computer-controlled events essential to the operation of the multi-axis, processor-controlled, toolhead positioning device.

As shown in FIG. 1 and FIG. 2, the first rotary table 32 is mounted on top of the base plate 24, along with its attached first rotary motor 34. A support tube mounting bracket 40 is attached to the top of the first rotary table 34. The workpiece mount assembly 28 is attached to the top of the support tube mounting bracket 40.

FIG. 3 shows a perspective view of the workpiece mount assembly 28 attached to the first rotary table 32. As part of the workpiece mount assembly 28, one end of a support tube 36 extends vertically upward, normal to the base plate 24 (see FIG. 1). The other end of the support tube 36 extends downward below the support tube mounting bracket 40 and through the first rotary table 32 at which point it is attached to the first linear motor 42 (see FIG. 4). A translating tube 38 rests inside and extends above the support tube 36. A workpiece mount 30 with an attached elastic or rubber grommet 56, or similar elastomeric o-ring, is mounted to the top of the translating tube 38 to provide a secure resting place for the workpiece 26. A keyway 58 is provided on the translating tube 38 to prevent independent rotation between the translating tube 38 and the support tube 36. FIG. 4 shows a bottom view of the workpiece mount assembly 28 and its attached first rotary table 32.

FIG. 5 shows a cross-sectional view of the workpiece mount assembly 28. A translating screw 48 attached to the first linear motor 42, runs vertically from the first linear motor 42 through the support tube 36, finally connecting to the bottom of the translating tube 38, for elevating the translating tube 38 vertically up and down. FIG. 5 illustrates one of several means of securing the workpiece 26. A vacuum line 52 extends into the support tube 36, coils around the translating screw 48, and continues its vertical extension upward and through the base of the translating tube 38 into the vacuum chamber 54 (i.e., the translating tube 38), for establishing a vacuum in order to secure the workpiece 26 to the top of the workpiece mount assembly 28. The elastic grommet 56 attached to the top of the workpiece mount 30, which in turn is mounted to the top of the translating tube 38, helps provide an airtight seal in effectively maintaining a vacuum on the workpiece 26 to securely hold it in place. The required suction for establishing a vacuum within the vacuum chamber 54 is created by using a source of negative pressure attached to the vacuum line 52, e.g., a vacuum pump (not shown on the drawings).

FIG. 5A illustrates a second means of securing the workpiece 26 through the use of a clamping device 59, such as a chuck or vise system mounted to the top of the translating tube 38.

FIG. 6 and FIG. 7 provide perspective views of the vertical support arms 60, 62. FIG. 6 shows a first vertical support arm 60 with a first rotating plate 68 pivotably mounted at the top, right-side of the first vertical support arm 60. FIG. 7 shows a second vertical support arm 62 with a similar second rotating plate 70, but with a second rotary table 72 and its attached second rotary motor 73 situated between the second rotating plate 70 and the second vertical support arm 62. The back of the second rotary table 72 is mounted to the top, left-side of the second vertical support arm 62 and the front of the second rotary table 72 is mounted to the second rotating plate 70.

FIG. 8 shows a bottom view of the gantry bridge assembly 65, which is comprised of mounting discs 75, 78, a gantry bridge 66, and an X-axis mounting plate 77. As shown in FIG. 8, the gantry bridge 66 is located on the bottom of the gantry bridge assembly 65, beneath the X-axis mounting plate 77. Mounting discs 75, 78, are attached to the ends of the gantry bridge 66 and X-axis mounting plate 77 combination.

FIG. 9 shows a top frontal view of the X-axis mounting plate 77. A second linear motor 90 is attached to one end of the X-axis mounting plate 77. An X-axis leadscrew 89 attached to the second linear motor 90, running horizontally from the second linear motor 90 along the longitudinal X-axis of the X-axis mounting plate 77, is connected midway along the X-axis mounting plate 77 to the X-axis carriage 91. The rotational movement of the X-axis leadscrew 89 imparts a linear motion to the attached X-axis carriage 91, allowing it to move linearly along the longitudinal X-axis of the X-axis mounting plate 77. FIG. 10 shows a top view of the gantry bridge assembly 65 with the X-axis mounting plate 77 mounted on top of the gantry bridge 66, two mounting discs 75, 78, attached to the ends of the gantry bridge 66 and X-axis mounting plate 77 combination, and the X-axis carriage 91 slidably mounted to the top of the X-axis mounting plate 77.

FIG. 11 provides an illustration of additional features of the gantry bridge assembly 65. A rotation pin 114 is attached to the end of the mounting disc 78 directly in the center of the disc. A pair of mounting bolts 112, 112A (see FIG. 12) is also attached to the end of the mounting disc 78, and is situated on the same side as the rotation pin 114, across from one another, with the rotation pin 114 located directly between them. The rotation pin 114 and mounting bolts 111, 111A, 112, 112A of each mounting disc 75, 78 are connected to both the first and second gantry arms 106, 108, with the mounting bolts 111, 111A, 112, 112A placed through the mounting bolt slots 115, 115A, 111, 111A (see FIG. 12 and FIG. 13) and the rotation pin 114 placed into a corresponding hole centered in between the mounting bolt slots 115, 115A, 111, 111A. The rotation pin 114 provides a pivot point about which the gantry bridge 66 and its attached X-axis mounting plate 77 (see FIG. 12 and FIG. 13) can be rotated so as to align a mounted toolhead 102 to a reference point on the workpiece 26. The rotation of the gantry bridge 66 and X-axis mounting plate 77 is accomplished by manipulating the placement of the mounting bolts 111, 111A, 112, 112A situated within the mounting bolt slots 115, 115A, 111, 111A. FIG. 16 shows an additional embodiment in which a third rotary table 130, and its attached third rotary motor 132, is mounted to the outside of one of the gantry arms 106. The third rotary table 130 is connected to the mounting bolts 112, 112A that are slidably mounted within the mounting bolt slots 115, 115A on the first gantry arm 106 (see FIG. 12 and FIG. 13). By rotating the third rotary table 132, the mounting bolts 112, 112A are repositioned along and within the mounting bolt slots 115, 115A. This causes the gantry bridge assembly 65 to rotate in an A-axis, re-aligning the position of the toolhead assembly base 80 and toolhead assembly 116 attached to it, relative to the workpiece 26.

Referring to FIG. 11, a carriage mounting bracket 79 is attached to the top of the slidably-mounted X-axis carriage 91. A Y-axis carriage guide rail 82 is mounted to the top of the carriage mounting bracket 79. The toolhead assembly base 80 is fitted onto the Y-axis carriage guide rail 82. A third linear motor 96 is attached to the rear of the carriage mounting bracket 79. A Y-axis leadscrew 95 attached to the third linear motor 96, running from the third linear motor 96 along the traverse Y-axis of the carriage mounting bracket 79, is connected to the toolhead assembly base 80. The rotational movement of the Y-axis leadscrew 95 imparts a linear motion to the attached toolhead assembly base 80, allowing it to move linearly along the traverse Y-axis of the carriage mounting bracket 79.

FIG. 12 is a perspective view of the front of the gantry 64, showing the gantry arms 106, 108 connected to each other by the gantry bridge 66 between them. FIG. 13 shows the same gantry 64 from a rear perspective.

FIG. 14 illustrates the gantry 64 connected to the vertical support arms 60, 62. The vertical support arms 60, 62 are positioned parallel and opposite one another. The first and second rotating plates 68, 70 are aligned facing each other, with a common centerline. The gantry arms 106, 108 are mounted to both first and second rotating plates 68, 70 of the vertical support arms 60, 62, placing the gantry 64 between both vertical support arms 60, 62. To balance the first and second gantry arms 106, 108, each arm has a first and second counterweight 84, 86 mounted on it, respectively. A stiffener plate 88 (see FIG. 13) is mounted to the bottom of the first and second gantry arms 106, 108 to provide structural support. FIG. 15 illustrates a different embodiment of the invention in which only one vertical support arm is used, providing a cantilever-type modification.

FIG. 17 provides a schematic of the computer-controlled system, which utilizes computer-aided machining (CAM) program software, either off-the-shelf or developed in-house, to control all movement of the first, second and third rotary motors 34, 73, 132, as well as the first, second, and third linear motors 42, 90, 96. The computer-controlled operation can be set-up with known techniques utilizing known CAM software and therefore will not be described in greater detail here. In-house software programs may be designed and developed to enhance the invention's utility in terms of efficiency and usefulness.

The function of minor parts (attachment/retaining screws, etc.) is evident from the drawings and is not described here.

(2) Operation of Invention

As a multi-axis, processor-controlled, toolhead-positioning device, the invention is not defined by a specific toolhead assembly, but by its ability to position a toolhead assembly about a workpiece 26. The easiest way to describe the operation of the invention is to provide a toolhead assembly as an example, along with a workpiece 26, and illustrate the movements and controls of the invention. The operational movements of the invention will clearly be shown, but the description of any additional aspects of the toolhead unit will not affect the invention's basic design and operation.

In the following description of the operation of the multi-axis, processor-controlled, toolhead positioning device, the chosen toolhead assembly for illustration purposes consists of a toolhead holder 100 (e.g. spindle) and toolhead 102 (e.g., cutting tool), with the gantry 64 positioned in a vertical direction, and the toolhead 102 facing due south. The workpiece 26 situated on the workpiece mount assembly 28 is a bowling ball. The invention will position and operate the toolhead assembly so as to engrave a design on the workpiece 26, e.g., bowling ball.

To begin the operation, the workpiece 26 (in this case, a bowling ball) is set on top of the elastic grommet 56 or some similar elastomeric o-ring attached to the workpiece mount 30. A vacuum pump (not shown in the figures) is turned on. As the air is evacuated from the vacuum chamber 54 within the translating tube 48 from the negative pressure exerted by the vacuum pump, the arcuate surface of the bowling ball is pressed against the elastic grommet 56 and the ball is held securely in place through the vacuum force of the applied negative pressure. Note that for other types of workpieces, particularly those without curved or flat surfaces, for which such a vacuum system would prove ineffective in securing the workpiece 26 to the workpiece mount 30, another type of securing means would have to be in place. Other such options would include mechanical fastening devices (e.g., chucks, vises, clamps, etc.), magnetic devices for certain metallic workpieces, (e.g., electromagnetic systems with external power source, natural magnetic systems), and chemical devices wherein the workpiece 26 may be attached to a mount by some form of epoxy or glue. The degree of security may depend upon the type of workpiece 26 used and the operation to be performed. For instance, the workpiece 26 must be totally secure and rigid in the mount for machining and tooling operations, whereas some form of strong glue attachment may be sufficient for painting operations using a spray paint toolhead assembly. The degree of security therefore depends upon the specific toolhead operation to be performed by the invention.

Once the bowling ball is securely mounted to the workpiece mount 30, the first linear motor 42 is engaged to turn the translating screw 48, which in turn acts to raise the translating tube 38, and along with it, the bowling ball. Once the bowling ball touches the contact switch 118 located below the toolhead 102, the computer 120 then automatically calculates the exact diameter of the sphere, knowing the height of the workpiece mount 30. The computer 120 will then calculate the proper tool, tool paths, and feed rates to apply a particular pattern (for engraving purposes) to a sphere of the calculated diameter. When the calculated tool, tool paths, and feed rates are calculated, the computer will instruct the first linear motor 42 to lower the sphere to the appropriate height such that the centerline of the sphere coincides with the height of the common centerline extending between the first and second rotating plates 68, 70. The toolhead 102 (e.g., cutting tool) will then be aligned with a reference point on the workpiece 26. Typically, this will be the center of the bowling ball.

Once the toolhead 102 is properly aligned with the reference point on the bowling ball, and the bowling ball is positioned for final tooling, the toolhead 102 is engaged and the computer 120 simultaneously controls the movements of the first rotary table 32 (which rotates the sphere in the C-axis), the second rotary table 72 (which allows the gantry 64 together with the toolhead 102 to rotate about the sphere in the A-axis) and third linear motor 96 (which controls the depth of the cut by allowing linear movement in the transverse Y-axis). Additional refinements to the engraving operation, such as changing the angle of approach of the toolhead 102 in the X and Z-axes, are also available. Off-setting the angle of approach of the toolhead 102 in the X-axis can be accomplished by moving the X-axis carriage 91 (upon which the toolhead assembly base 80 is mounted). Engaging the second linear motor 90 to turn the X-axis leadscrew 89, acts to move the connecting X-axis carriage 91, off-setting the angle of approach of the toolhead 102 relative to an arcuate surface area. Off-setting the angle of approach of the toolhead 102 in the Z-axis is accomplished by raising or lowering the bowling ball. Engaging the first linear motor 42 turns the translating screw 48, which in turn acts to raise or lower the translating tube 38, and along with it, the bowling ball.

FIG. 17 is a schematic block diagram of the computer-controlled events. The operation of the computer 120 is as follows: The computer 120 generates tool-paths from a computer-aided machining (CAM) program, and processes it into G-code (directions for electromechanical devices). While operating numerical control (NC) software, the G-code is sent to the controller. The controller takes the G-code and creates individual commands for all axis involved. These commands are sent to the drive for each respective axis. In addition to the commands received from the controller, the drive also receives regulated power from a power supply. The signal from the controller is amplified and sent to a motor as electrical current. The motor's onboard encoder monitors precise rotation, and relays actual positions to controller, and then back to the CNC software. Positional information received from the encoder (through the controller) is referenced by numerical control software and corrective signals are generated if necessary. These actions effect great positional accuracy and system stability.

As a CNC device, position feedback signals are continually being sent back to the computer 120 and new commands sent to the computer-controlled motors to precisely machine components. Machine components are tooled using simultaneous multi-axis coordinated motions. Once a particular part(s) program (computer software) is prepared, CNC machines are designed to function unattended. The multi-axis, processor-controlled, toolhead positioning device can work with existing software; however, proprietary software may be developed to enhance the capabilities of the multi-axis, processor-controlled, toolhead-positioning device to work with specific toolhead assemblies.

(3) Description and Operation of Alternate Embodiments

Other alternate embodiments deal with the securing means relative to the workpiece mount assembly 28. Instead of the vacuum clamping system described in the preferred embodiment of the invention, other securing means are available for securing a workpiece 26 to the workpiece mount assembly 28. FIG. 5A is a perspective view of the workpiece mount assembly 28 with a mechanical clamping attachment. This clamping attachment may consist of a chuck or some other type of mechanical clamp mounted to the top of the translating tube 38 for securing the workpiece 26 to the workpiece mount assembly 28. Another securing method may include utilizing magnetic devices for certain metallic workpieces (e.g., electromagnetic systems with external power source, natural magnetic systems, etc.). Yet another securing means may include some form of chemical clamping system involving glues or epoxies. These systems may be appropriate when the workpiece 26 is being photographed, painted, or having some other technique applied to it, whereby a rigid security system is not required.

The multi-axis, processor-controlled, toolhead positioning device is fully scalable and can be adapted to many various sizes. It may be sized to hold a cutting device for large motors, or it may be sized specifically for engraving bowling balls, or it may be sized even smaller for grinding and polishing lenses. These are simply examples of the scalability of the invention, and are not meant to be limiting by any means.

It is conceivable that the multi-axis, processor-controlled, toolhead positioning device can be manufactured with one vertical support arm instead of two support arms 60, 62 as described in the preferred embodiment. FIG. 15 is an illustration of the invention with one vertical support arm.

Instead of manually adjusting the mounting bolts 111, 111A, 112, 112A on the gantry 64, this function may be automated by attaching a third rotary table 130 to one of the gantry arms 106 with control assigned to the computer system. FIG. 16 provides an illustration of a rotary table 130 attached to the gantry arm 106.

Still another embodiment of the multi-axis, processor-controlled, toolhead positioning device provides for the addition of a toolhead changer supplied with numerous toolhead attachments.

Still another embodiment provides for the gantry to be permanently attached to a fixed toolhead assembly unit, unable to move. Instead of the gantry moving, the base of the multi-axis, processor-controlled, toolhead positioning device moves about the toolhead assembly unit. In other words, the base with the attached rotating workpiece rotates about the fixed toolhead assembly unit by means of the pivotably supported vertical support arms.

Ramifications

The vast majority of ramifications concern the type of toolhead assembly mounted onto the multi-axis, processor-controlled, toolhead positioning device's toolhead assembly base. As the invention is designed to provide a precision-positioning device and the associated mounting platform for a toolhead assembly, the following is a list of various ramifications that immediately come to mind. This list is by no means intended to be limiting, but merely indicative of the immense scope and range of uses posed by the current invention. The ramifications include:

(1) the control of a toolhead, such as a machine tool, relative to the surface of a workpiece which is to be machined;

(2) the control of a toolhead, such as an engraver, relative to the surface of a workpiece which is to be engraved;

(3) the control of a toolhead, such as a polisher, relative to the surface of a workpiece which is to be polished;

(4) the control of a toolhead, such as a grinder, relative to the surface of a workpiece which is to be ground;

(5) the control of a toolhead, such as a sand blaster, relative to the surface of a workpiece which is to be sand blasted;

(6) the control of a toolhead, such as a cutting torch, relative to the surface of a workpiece which is to be torch-cut;

(7) the control of a toolhead, such as an ink printer, relative to the surface of a workpiece which is to be printed;

(8) the control of a toolhead, such as an paint sprayer, relative to the surface of a workpiece which is to be spray painted;

(9) the control of a toolhead, such as an photographic camera, relative to the surface of a workpiece which is to be photographed;

(10) the control of a toolhead, such as an coordinate measurement probe, relative to the surface of a workpiece which is to be probed for coordinate measurements;

(11) the control of a toolhead, such as an coordinate measurement laser scanner, relative to the surface of a workpiece which is to be scanned for coordinate measurements;

(12) the control of a toolhead, which may be a laser beam for directing a laser beam to a impinge upon a particular point on the surface of a workpiece, for cutting or etching the surface;

(13) the control of a toolhead, which may be a powder-fed laser fusion welding torch that allows customized welding upon a particular point on the surface of a workpiece, for laser fusion welding by delivery of laser light onto a stream of welding fusion powder;

(14) the control of a toolhead, which may be a deposit welder that allows customized welding upon a particular point on the surface of a workpiece by delivery of laser light onto a stream of welding fusion powder;

(15) the control of a toolhead, which may be a electron beam welding device that produces a weld by impinging a beam of high energy electrons to heat the weld joint upon a particular point on the surface of a metal workpiece;

(16) the control of a toolhead, which may be a electrical discharge machine that erodes material in the path of electrical discharges that forms an arc between an electrode tool and the surface of a metal workpiece;

(17) the control of a toolhead, which may be a video camera, relative to the surface of a workpiece for which a video tape or file may be made;

(18) the control of a toolhead, which may be a hot melt adhesive dispensing unit, relative to the surface of a workpiece for dispensing adhesive;

(19) the control of a toolhead, which may be a gas tungsten arc welding device that produces a weld by forming an arc between a non-consumable tungsten electrode and the particular point on the surface of a metal workpiece;

(20) the control of a toolhead, which may be a gas metal arc welding device that produces a deposition weld by releasing a shielding gas which forms the arc plasma and stabilizes the arc on the metal being welded, shields the arc and molten weld pool, and allows smooth transfer of metal from the weld wire to the molten weld pool; and

(21) the control of a toolhead, which may be a high pressure water jet cutting device relative to the surface of a workpiece which is to be cut.

The numerous and varied ramifications are based for the most part on the type of toolhead assembly mounted on the toolhead assembly base. Other ramifications include the grinding and polishing of spherical and aspherical glass lenses, including those for eyeglasses, telescopes, microscopes, etc. The ramifications listed above demonstrate only a small fraction of the potential toolhead assemblies available for mounting onto, and inclusion into, the present invention. The numerous variations would be obvious to one of ordinary skill in the art. The description of the preferred embodiment with a specific toolhead is intended for illustration purposes only in describing the structure and operation of the multi-axis, processor-controlled, toolhead positioning device, and is not meant to be limiting.

Conclusions and Scope

In conclusion, the multi-axis, processor-controlled, toolhead positioning device is unique and novel by providing a toolhead positioning device with six degrees of freedom, but utilizing movement in only five axes. This is possible through the design and creation of a new and innovative configuration.

The multi-axis, processor-controlled, toolhead positioning device is unique and novel in providing a toolhead assembly base for mounting different toolhead assemblies to the invention. By concentrating on the positioning and platform aspect of the machining device, rather than the toolhead assembly, the invention creates much greater flexibility in form and function by being able to utilize the capabilities of many different toolhead assemblies, simply by mounting a specific toolhead assembly to the toolhead assembly base. Then the attached toolhead assembly is allowed to operate about a workspace with six degrees of freedom, but utilizing only five axes of movement.

By being fully scalable in size, the multi-axis, processor-controlled, toolhead positioning device further demonstrates its flexibility in design and function.

We claim:

1. A multi-axis, processor-controlled, toolhead positioning device comprising:
   (a) a base plate;
   (b) a first rotary table mounted on said base plate;
   (c) a first rotary motor attached to said first rotary table for rotation of said first rotary table in a rotational C-axis;
   (d) a workpiece mount assembly rotatably supported on said first rotary table for rotation in the rotational C-axis;
   (e) means for elevating said workpiece mount assembly so that it moves up and down along a vertical Z-axis normal to said base plate;
   (f) means for securing a workpiece to said workpiece mount assembly;
   (g) at least one vertical support arm attached to said base plate;
   (h) a gantry pivotably supported on said vertical support arm for rotation about the workpiece in a rotational A-axis;
   (i) means for rotating said gantry so that it rotates about the workpiece in the rotational A-axis;
   (j) a toolhead assembly base slidably mounted on said gantry;
   (k) means for moving said toolhead assembly base so that it travels along linear X and Y-axes; and
   (l) a computer for generating and coordinating control signals sent to said multi-axis, processor-controlled, toolhead positioning device.

2. The device of claim 1, wherein said workpiece mount assembly comprises:
   (a) a support tube, mounted to said first rotary table, positioned above and normal to said base plate; and
   (b) a translating tube, situated inside and extending above said support tube.

3. The device of claim 2, wherein said means for elevating said workpiece mount assembly comprises:
   (a) a first linear motor mounted to the bottom of said support tube; and
   (b) a translating screw connecting said first linear motor to the bottom of said translating tube.

4. The device of claim 3, wherein said means for securing comprises:
   (a) a support mount attached to the top of said translating tube;
   (b) an elastic grommet attached to the top of said support mount;
   (c) a vacuum chamber located within said translating tube; and
   (d) a vacuum line connected to said vacuum chamber for applying a vacuum from a source of negative pressure.

5. The device of claim 4, wherein said vertical support arm comprises:
   (a) a first vertical support arm mounted to said base plate; and
   (b) a second vertical support arm mounted to said base plate, positioned opposite and parallel to said first vertical support arm.

6. The device of claim 5, wherein said gantry comprises:
   (a) a gantry bridge assembly;
   (b) a first gantry arm attached at one end to said gantry bridge assembly, with the other end attached to said first vertical support arm; and
   (c) a second gantry arm attached at one end to said gantry bridge assembly, with the other end attached to said second vertical support arm.

7. The device of claim 6, wherein said means for rotating comprises:
   (a) a second rotary table mounted between said second vertical support arm and said second gantry arm; and
   (b) a second rotary motor attached to said second rotary table.

8. The device of claim 7, wherein said means for moving comprises:
   (a) an X-axis carriage slidably mounted on top of said gantry bridge assembly;
   (b) a second linear motor mounted on top of said gantry bridge assembly;
   (c) an X-axis leadscrew connecting said second linear motor to said X-axis carriage for movement of said X-axis carriage in linear direction along the X-axis of said gantry bridge assembly;
   (d) a carriage mounting bracket mounted to the top of said X-axis carriage and to the bottom of said toolhead assembly base;
   (e) a third linear motor mounted to the back of said carriage mounting bracket; and
   (f) a Y-axis leadscrew connecting said third linear motor to said toolhead assembly base for movement of said toolhead assembly base in a linear direction along the Y-axis of said gantry bridge assembly.

9. The device of claim 8, further comprising a plurality of mounting bolts attached to both ends of said gantry bridge assembly, said mounting bolts fitted onto and through the ends of said first and second gantry arms, for aligning a toolhead to a reference point relative to the workpiece.

10. The device of claim 8, further comprising:
(a) a third rotary table mounted onto the end of said first gantry arm, side opposite said gantry bridge assembly;
(b) a plurality of mounting bolts attached to both ends of said gantry bridge assembly;
(c) said third rotary table connected to said gantry bridge assembly by said mounting bolts protruding through said first gantry arm, said mounting bolts attached to said third rotary table; and
(d) a third rotary motor attached to said third rotary table, for rotation of said third rotary table in the A-axis, whereby a toolhead can be aligned to a reference point relative to the workpiece.

11. The device of claim 3, wherein said means for securing comprises a clamping device mounted to the top of said translating tube.

12. The device of claim 11, wherein said vertical support arm comprises:
(a) a first vertical support arm mounted to said base plate; and
(b) a second vertical support arm mounted to said base plate, positioned opposite and parallel to said first vertical support arm.

13. The device of claim 12, wherein said gantry comprises:
(a) a gantry bridge assembly;
(b) a first gantry arm attached at one end to said gantry bridge assembly, with the other end attached to said first vertical support arm; and
(c) a second gantry arm attached at one end to said gantry bridge assembly, with the other end attached to said second vertical support arm.

14. The device of claim 13, wherein said means for rotating comprises:
(a) a second rotary table mounted between said second vertical support arm and said second gantry arm; and
(b) a second rotary motor attached to said second rotary table.

15. The device of claim 14, wherein said means for moving comprises:
(a) an X-axis carriage slidably mounted on top of said gantry bridge assembly;
(b) a second linear motor mounted on top of said gantry bridge assembly;
(c) an X-axis leadscrew connecting said second linear motor to said X-axis carriage for movement of said X-axis carriage in linear direction along the X-axis of said gantry bridge assembly;
(d) a carriage mounting bracket mounted to the top of said X-axis carriage and to the bottom of said toolhead assembly base;
(e) a third linear motor mounted to the back of said carriage mounting bracket; and
(f) a Y-axis leadscrew connecting said third linear motor to said toolhead assembly base for movement of said toolhead assembly base in a linear direction along the Y-axis of said gantry bridge assembly.

16. The device of claim 15, further comprising a plurality of mounting bolts attached to both ends of said gantry bridge assembly, said mounting bolts fitted onto and through the ends of said first and second gantry arms, for aligning a toolhead to a reference point relative to the workpiece.

17. The device of claim 15, further comprising:
(a) a third rotary table mounted onto the end of said first gantry arm, side opposite said gantry bridge assembly;
(b) a plurality of mounting bolts attached to both ends of said gantry bridge assembly;
(c) said third rotary table connected to said gantry bridge assembly by said mounting bolts protruding through said first gantry arm, said mounting bolts attached to said third rotary table; and
(d) a third rotary motor attached to said third rotary table, for rotation of said third rotary table in the A-axis, whereby a toolhead can be aligned to a reference point relative to the workpiece.

18. The device of claim 1, wherein said gantry comprises:
(a) a gantry bridge assembly; and
(b) at least one gantry arm, with one end of said gantry arm attached to said gantry bridge assembly, and the other end of said gantry arm pivotably supported on said vertical support arm.

19. The device of claim 18, wherein said means for rotating comprises:
(a) a second rotary table mounted between said vertical support arm and said gantry arm; and
(b) a second rotary motor attached to said second rotary table.

20. The device of claim 19, further comprising a plurality of mounting bolts attached to the end of said gantry bridge assembly, said mounting bolts fitted onto and through the end of said gantry arm, for aligning a toolhead to a reference point relative to the workpiece.

21. The device of claim 1, wherein said means for securing comprises a mechanical clamping device mounted to the top of said workpiece mount assembly.

22. A method for precisely positioning a toolhead assembly, comprising the steps of:
(a) Securing a workpiece to a workpiece support mount;
(b) Elevating the secured workpiece vertically along a Z-axis;
(c) Aligning a mounted toolhead to a reference point on the secured workpiece; and
(d) Executing programmed machine operations, beginning upon alignment of the mounted toolhead to the workpiece reference point, for generating and coordinating control signals sent to said multi-axis, processor-controlled, toolhead positioning device, such that the mounted toolhead may be positioned and controlled in substantially a 180-degree A-axis arc, perpendicular to the movement of the workpiece rotating in a C-axis, for achieving six degrees of freedom of movement.

* * * * *